US010846356B2

(12) United States Patent
Gopalakrishnan et al.

(10) Patent No.: US 10,846,356 B2
(45) Date of Patent: Nov. 24, 2020

(54) SCALABLE WHITTLED PROXY EXECUTION FOR LOW-LATENCY WEB OVER CELLULAR NETWORKS

(71) Applicants: AT&T Intellectual Property I, L.P., Atlanta, GA (US); Purdue University, West Lafayette, IN (US)

(72) Inventors: Vijay Gopalakrishnan, Edison, NJ (US); Subhabrata Sen, Westfield, NJ (US); Shankaranarayanan Puzhavakath Narayanan, Hillsborough, NJ (US); Ashiwan Sivakumar, Pittsburgh, PA (US); Sanjay Rao, West Lafayette, IN (US); Mithuna Thottethodi, West Lafayette, IN (US); Terani Vijaykumar, West Lafayette, IN (US)

(73) Assignees: AT&T Intellectual Property I, L.P., Atlanta, GA (US); Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/006,951

(22) Filed: Jun. 13, 2018

(65) Prior Publication Data
US 2019/0384862 A1    Dec. 19, 2019

(51) Int. Cl.
*G06F 16/957* (2019.01)
*G06F 40/14* (2020.01)
*G06F 40/197* (2020.01)

(52) U.S. Cl.
CPC .......... *G06F 16/9574* (2019.01); *G06F 40/14* (2020.01); *G06F 40/197* (2020.01)

(58) Field of Classification Search
CPC ............ G06F 16/9574; G06F 17/2247; G06F 17/2288
(Continued)

(56) References Cited

U.S. PATENT DOCUMENTS 7,210,094 B2    4/2007  Dovin et al.
7,389,330 B2    6/2008  Dillon et al.
(Continued)

OTHER PUBLICATIONS

Wang et al., "Speeding up Web Page Loads with Shandian," 13th USENIX Symposium on Networked Systems Design and Implementation (NSDI 16), Mar. 16-18, 2016, pp. 109-122.
(Continued)

*Primary Examiner* — Andrew R Dyer
(74) *Attorney, Agent, or Firm* — Hartman & Citrin LLC

(57) ABSTRACT

A whittling proxy system can receive a target web page that includes a plurality of Javascript functions and a plurality of objects needed to load the target web page. The system can determine a target Javascript function of the plurality of Javascript functions to be tested for a whittling capability. The system can generate a full version and a partial version of the target web page. The full version includes all of the plurality of Javascript functions. The partial version includes the plurality of Javascript functions excluding the target Javascript function. The system can conduct a test to determine a first page signature associated with the full version and a second page signature associated with the partial version. The system can determine if the first page signature matches the second page signature, and if so, can determine that the target Javascript function can be whittled.

20 Claims, 22 Drawing Sheets

(58) Field of Classification Search
USPC .................. 715/201, 209, 210, 229, 234
See application file for complete search history.

(56) References Cited

U.S. PATENT DOCUMENTS

| | | | |
|---|---|---|---|
| 7,617,294 B1 | 11/2009 | Harding | |
| 8,112,471 B2 | 2/2012 | Wei et al. | |
| 8,977,653 B1 | 3/2015 | Mahkovec et al. | |
| 9,135,364 B1 | 9/2015 | Sundaram et al. | |
| 9,158,845 B1 | 10/2015 | Reddy et al. | |
| 9,430,200 B1* | 8/2016 | Trofin | G06F 8/443 |
| 9,438,701 B2 | 9/2016 | Annamalaisami et al. | |
| 9,565,139 B2 | 2/2017 | Veiga | |
| 9,619,445 B1* | 4/2017 | Neuberg | G06F 17/2247 |
| 9,723,057 B2 | 8/2017 | Wiener et al. | |
| 9,740,668 B1 | 8/2017 | Saurav | |
| 9,819,721 B2* | 11/2017 | Bendell | G06F 16/957 |
| 9,864,365 B2* | 1/2018 | Reid | G05B 19/054 |
| 10,108,400 B1* | 10/2018 | Myren | G06F 8/34 |
| 10,157,049 B2* | 12/2018 | Haviv | G06F 8/443 |
| 10,216,488 B1* | 2/2019 | Overson | H04L 63/1433 |
| 2002/0138511 A1* | 9/2002 | Psounis | H04L 67/2852 |
| | | | 715/255 |
| 2005/0285870 A1* | 12/2005 | Sirois | G06F 9/45516 |
| | | | 345/562 |
| 2009/0210498 A1* | 8/2009 | Sze | H04L 67/04 |
| | | | 709/206 |
| 2010/0205523 A1* | 8/2010 | Lehota | G06F 16/9577 |
| | | | 715/235 |
| 2011/0055814 A1* | 3/2011 | Klarer | G06F 8/443 |
| | | | 717/124 |
| 2011/0099294 A1* | 4/2011 | Kapur | H04L 67/02 |
| | | | 709/246 |
| 2011/0276893 A1* | 11/2011 | Yambal | G06Q 30/01 |
| | | | 715/745 |
| 2011/0314091 A1* | 12/2011 | Podjarny | G06F 17/2247 |
| | | | 709/203 |
| 2014/0156613 A1* | 6/2014 | Meadows | H04L 65/80 |
| | | | 707/693 |
| 2014/0157104 A1* | 6/2014 | Carlsen | G06F 16/958 |
| | | | 715/234 |
| 2015/0100879 A1* | 4/2015 | Nandagopal | G06F 9/44521 |
| | | | 715/235 |
| 2015/0178263 A1* | 6/2015 | Meschkat | G06F 17/248 |
| | | | 715/235 |
| 2015/0234652 A1* | 8/2015 | Naveh | G06F 8/4435 |
| | | | 717/121 |
| 2015/0254219 A1* | 9/2015 | Harel | G06F 17/2247 |
| | | | 715/234 |
| 2016/0100030 A1* | 4/2016 | Brown | G06F 3/0482 |
| | | | 715/738 |
| 2018/0246803 A1* | 8/2018 | Zhang | G06F 11/3688 |
| 2019/0042713 A1* | 2/2019 | Porcelli | G06F 21/14 |
| 2019/0073481 A1* | 3/2019 | Angelino | G06F 8/65 |

OTHER PUBLICATIONS

Sivakumar et al., "PARCEL: Proxy Assisted Browsing in Cellular networks for Energy and Latency reduction," Proceedings of the 10$^{th}$ ACM International Conference on Emerging Networking Experiments and Technologies, Dec. 2-5, 2014, pp. 1-12.

* cited by examiner

SCALABLE WHITTLED PROXY EXECUTION FOR LOW-LATENCY WEB OVER CELLULAR NETWORKS

STATEMENT REGARDING FEDERALLY SPONSORED RESEARCH OR DEVELOPMENT

This invention was made with government support under CNS-1618921 awarded by National Science Foundation. The government has certain rights in the invention.

BACKGROUND

Web pages have evolved from simple and relatively static pages to dynamic pages that are feature-rich and customized to individual user preferences. This evolution, however, has made web pages significantly more complex, with most web pages comprising tens to hundreds of static and dynamic objects (e.g., images, cascading style-sheets ("CSS"), JAVASCRIPT (a trademark of Oracle America, Inc., referred to hereinafter as "Javascript" or "JS") files, and the like) downloaded from multiple domains. Consequently, today's web page download process involves many hypertext transfer protocol ("HTTP") request-response interactions, each of which is triggered due to the parsing of or the interpretation of one or more objects on the web page. When network latency is high, as is typically the case with cellular networks, the load times for web pages increase significantly, resulting in a degraded user experience. Users, on the other hand, have come to expect an interactive experience to the extent that studies show revenue losses due to poor responsiveness.

Many recent attempts, most notably SPDY have attempted to address protocol level limitations with traditional HTTP. SPDY seeks to accelerate web page loads by allowing for multiple outstanding requests in parallel on a single connection, and supporting out-of-order delivery of responses. However, the performance improvements of SPDY in the real world are mixed. A key reason for this is that the objects needed for the web page to load cannot be requested in parallel because of complex dependencies in pages. To overcome this limitation, SPDY provides a feature where the server can push objects to the client without waiting for explicit client requests. However, a server push requires explicit identification of objects that can be pushed. This constraint is non-trivial since many web pages require parsing HTML and CSS, and executing Javascript to identify the associated objects.

Recent proposals suggest the use of a powerful, well-connected proxy that can emulate part of the client functionality, including Javascript execution, and can push the required objects to the client. The functionality, and hence complexity, of this proxy design can vary depending on the solution. In one approach, the client performs all of the functions of a traditional client, while proxies perform redundant execution, merely to identify and push objects needed by the client. In another approach, the proxy generates a rendered page that the client can display with minimal work. Here, proxy computation is not redundant, and client-side processing is completely or partially eliminated. Results show that both redundant and non-redundant execution can significantly reduce web page load times. While non-redundant execution promises additional benefits by reducing or eliminating client-side compute operations, it may result in additional latencies on client interactions for the complete elimination approaches, or additional complexity associated with migrating execution state mid-flight from the proxy to the client for the partial elimination approaches. Regardless of the proxy design choice, the benefits of a proxy are at the cost of significant additional computational overheads, a dominant component of which is Javascript execution. Deploying such proxies at carrier-scale to millions of users requires that the computational overheads of the approach be economized.

SUMMARY

Concepts and technologies disclosed herein are directed to scalable whittled proxy execution for low-latency web over cellular network. According to one aspect of the concepts and technologies disclosed herein, a whittling proxy system can include a processor and memory. The memory can include computer-executable instructions that, when executed by the processor, cause the processor to perform operations. In particular, the whittling proxy system can receive a target web page. The target web page can include a plurality of Javascript functions and a plurality of objects needed to load the target web page. The whittling proxy system can determine a target Javascript function of the plurality of Javascript functions to be tested for a whittling capability. The whittling proxy system can generate a full version of the target web page. The full version of the target web page can include all of the plurality of Javascript functions. The whittling proxy system can generate a partial version of the target web page. The target version of the target web page can include the plurality of Javascript functions excluding the target Javascript function. The whittling proxy system can conduct a test to determine if the target Javascript function can be safely whittled while ensuring that the plurality of objects needed to load the target web page can be fetched. A result of the test can include a first page signature associated with the full version of the target web page and a second page signature associated with the partial version of the target web page. The whittling proxy system can determine if the first page signature matches the second page signature, and in response to determining that the first page signature matches the second page signature, the whittling proxy system can determine that the target Javascript function can be whittled. The whittling proxy system, in response to determining that the first page signature does not match the second page signature, can determine that the target Javascript function cannot be whittled.

In some embodiments, the whittling proxy system can sort the plurality of Javascript functions based upon execution time to create a sorted list of Javascript functions. The whittling proxy system can select the target Javascript function from the sorted list of Javascript functions. The whittling proxy system also can determine if the target Javascript function is last in the sorted list of Javascript functions. In response to determining that the target Javascript function is not last in the sorted list of Javascript functions, the whittling proxy system can whittle the target Javascript function from a future iteration of at least a portion of the foregoing operations. The whittling proxy system also can set the final version of the target web page to include the plurality of Javascript functions excluding the target Javascript function, select a further Javascript function from the sorted list of Javascript functions, and can perform a future iteration of at least the portion of the foregoing operations for the further Javascript function.

In some embodiments, the whittling proxy system can, in response to determining that the target Javascript function is last in the sorted list of Javascript functions, generate a final Javascript code for the target web page. The final Javascript code can include only a subset of the plurality of Javascript functions that have not been whittled.

In some embodiments, the whittling proxy system can receive, over time, a plurality of future versions of the target web page. Each future version of the target web page can include the target Javascript function and a different plurality of objects needed to load the target web page. The whittling proxy system can whittle the target Javascript function from each future version of the target Web page.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
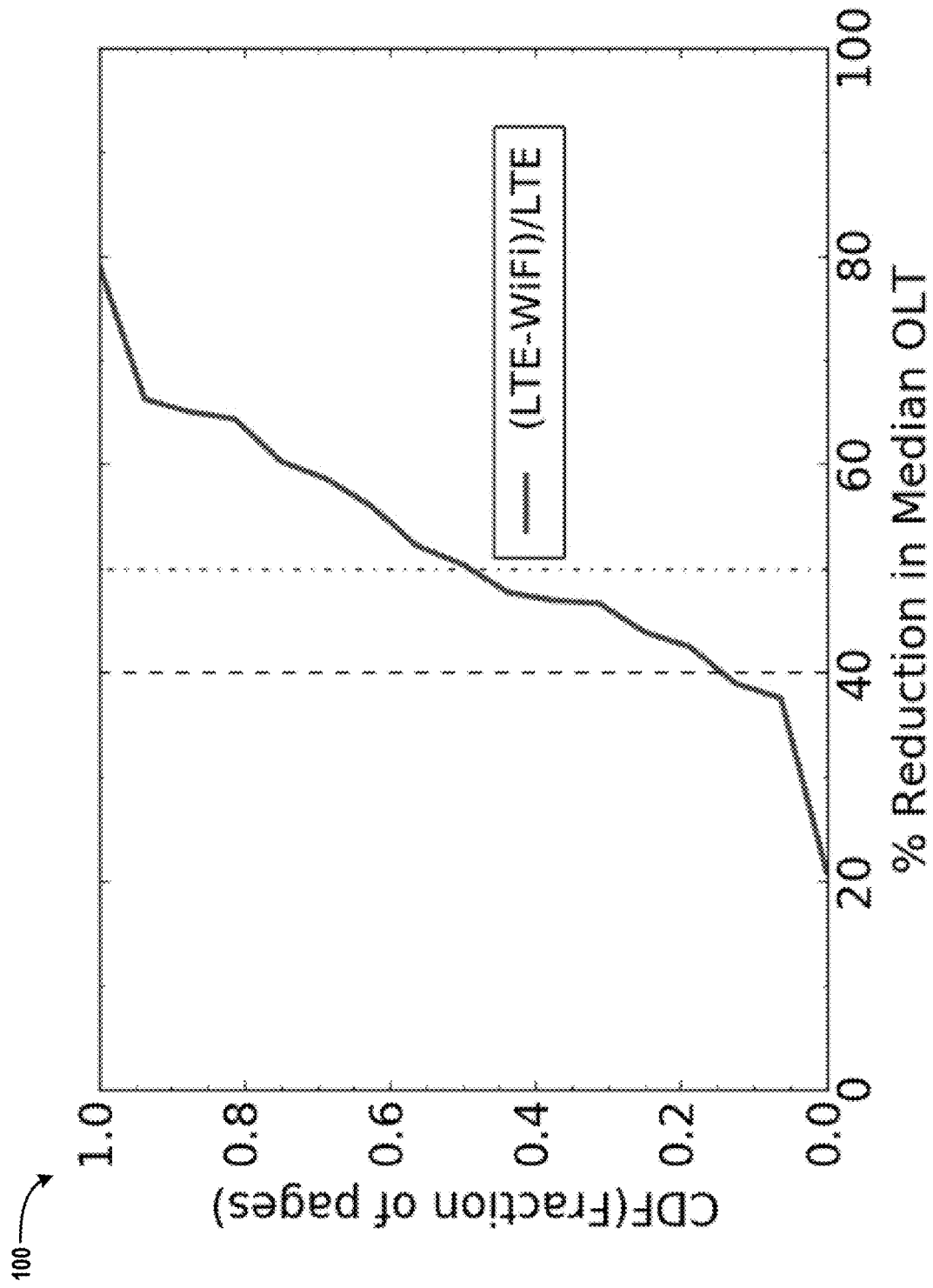
FIG. 1 is a line chart illustrating a percentage reduction in onload time ("OLT") for mobile web page loads when moving from a Long-Term Evolution ("LTE") network to a Wi-Fi network.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

The concepts and technologies disclosed herein focus, in part, upon minimizing the proxy computational overhead in general, and Javascript execution overhead in particular. The concepts and technologies disclosed herein address this challenge in the context of redundant execution, since redundant execution is simple, allows for responsive client interactions, and is well-suited for cellular settings where the network constitutes more than half the client latency.

A system disclosed herein is designed to handle the aforementioned challenges by leveraging two key observations. First, the proxy need not execute all Javascript code (e.g., UI-related code need not be executed). Instead, only a subset of code necessary to identify and fetch the objects to be pushed is executed. In other words, using terminology used in the programming language community, only the backward slice of the code related to uniform resource locator ("URL") fetching must be executed. Second, while static analysis of Javascript code is a hard, open research problem, proxies can approximate the backward slice since only the redundant proxy execution is affected. Because the client performs the actual full execution, the client would directly fetch any objects not pushed by the proxy, trading off client latency for computation at the proxy without any correctness problems.

Statement-level slicing is time-consuming. A new approach referred to herein as "whittling," works at Javascript function granularity, turning off entire functions that do not affect the set of fetched objects. Whittling dynamically learns the slices by turning off function definitions—that is, all the invocations of a function, whereas conventional slicing selectively turns off individual invocations. The approach is complicated by two issues. First, examining all Javascript functions would be time-consuming. Second, owing to inter-function dependencies, turning off two functions simultaneously might impact object fetching, although turning off functions individually might not. The concepts and technologies disclosed herein address the first issue by exploiting the fact that a majority of Javascript execution time is spent in a small fraction of heavy functions. The concepts and technologies disclosed herein can identify heavy functions via profiling and is designed to examine only these functions. Because identifying the optimal set of independent functions would be time-consuming, the concepts and technologies disclosed herein address the second issue with a greedy approach of examining functions in the decreasing order of execution time, to determine a set of functions that can be turned off together. Finally, despite the above optimizations, whittling at every page load would be too slow to be effective. To this end, the concepts and technologies disclosed herein exploit the fact that although specific objects in a page change (e.g., images, text, etc.), the Javascript code used in a page is stable over a period of several hours to allow profitable reuse of the same slice over several loads of a given page.

The concepts and technologies provide many contributions to the current state of the art. In particular, the concepts and technologies disclosed herein present the first effort for scaling execution-based web proxy designs. A dynamic learning scheme, called whittling, is used to compute approximate backward slices of object fetches at function granularity. In addition, optimizations to whittling are proposed to make whittling computationally efficient, practical, and effective.

Example results of implementing the concepts and technologies are also disclosed herein. Briefly, experiments conducted on 78 web pages resulted in a reduction of Javascript computation time by 1.33× in the median case, and up to 4× for some web pages. Moreover, user requests per second increased on average by 27% for a range of web page popularity models, and up to 4× for some web pages. The scalability benefits can be achieved while preserving, and even exceeding the latency gains of a redundant execution approach. By combining redundant execution and whittling, the disclosed system achieves speedups in median page load times of 1.5 compared to SPDY, and speedups of 20% compared to fully-redundant execution for 15% of the sample web pages.

Whittling can be computed in an online fashion. Through a longitudinal study the disclosed system shows that for 92% of the web pages, whittling remains accurate (i.e., it pushes all the needed objects) over 3-hour windows. Further, the whittled Javascript can be reused across users due to large code overlap.

The overall client latency includes compute delay (for parsing and executing HTML, CSS, and Javascript, and for rendering) and network delay to fetch the required objects for a given web page. For mobile device over cellular network, which is a focus of the concepts and technologies disclosed herein, network delay is the dominant component of the overall client latency.

Turning now to FIG. 1, a line chart 100 illustrating a percentage reduction in onload time ("OLT") for mobile web page loads when moving from a Long-Term Evolution ("LTE") network to a Wi-Fi network will be described. The illustrated line chart 100 shows the reduction in the OLT for a mobile device, such as a smartphone or other LTE-compatible device, when moving from a cellular LTE connection to a Wi-Fi connection to access a sample set of the top 20 web pages selected based upon the top web pages according to ALEXA INTERNET, INC. (hereinafter referred to as "Alexa"). The OLT is a common measure of page load latency. The OLT is the time from request initiation until when a browser triggers an onLoad( ) event. The line chart 100 of FIG. 1 shows that the OLT reduces by more than 50% for 53% of the pages in the sample set, and by more than 40% for 82% of the pages in the sample set. Since the compute activity in both cases is the same, these percentages directly relate to the network delay component of the overall client latency. The network delay component might, in fact, be higher because a portion of the latency with Wi-Fi also could be attributed to network activity.

Prior to receiving a URL, a browser does not know what the web page associated with that URL should look like. The browser communicates with the web server that serves the web page associated with that URL and fetches objects, such as HTML files, Javascript code, and images. After an object is fetched, the browser analyzes the object to determine what content the object contains to be added to the rendered web page. Often times, however, the analysis performed on one object leads the browser to fetching additional objects, which are dependent upon the initial fetched object. For example, the browser might need to execute some Javascript code before triggering additional fetch operations to fetch and render images. The browser does not have access to these dependencies due to the way in which HTML expresses the structure of web pages. For this reason, browsers are typically designed to be conservative during the object load process, and submit multiple fetch requests to the web server instead of assuming certain dependencies. These additional fetches increase the network delay component of the overall client latency.

Figure 2:
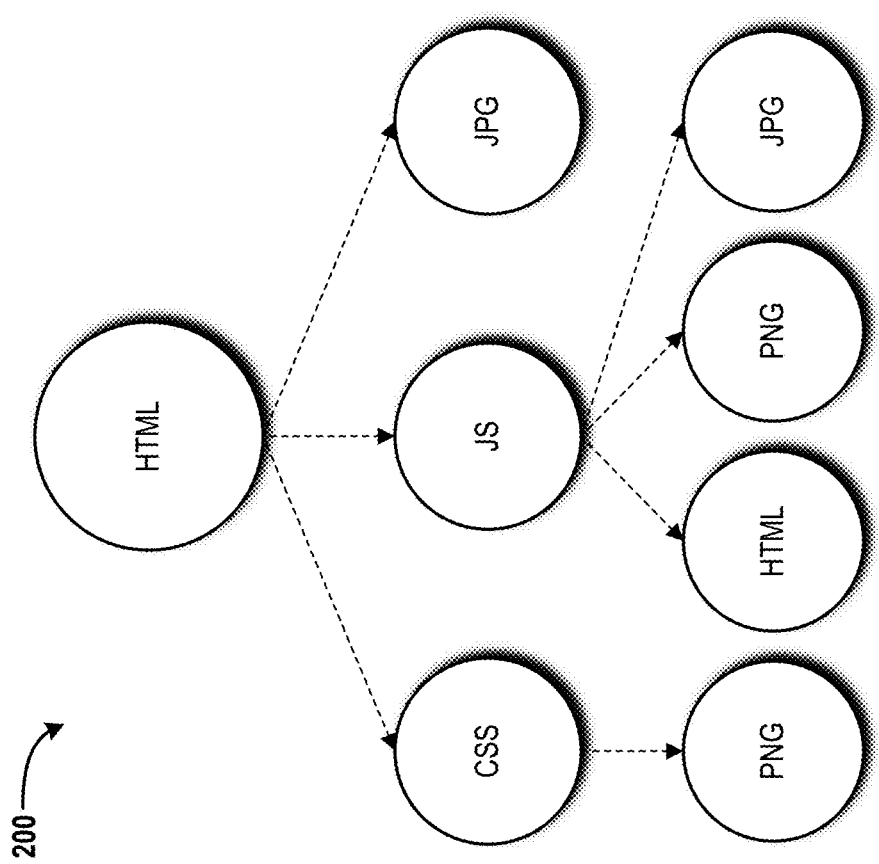
FIG. 2 is a dependency graph of a web page load.

A commonly-used technique to reduce the network delay component of the OLT is server push, which controls what objects are pushed to the client without explicit requests. The dependencies inherent in web pages are problematic for any push technique because objects required later in the page load process can be identified only after the execution of prior objects (e.g., Javascript). An example dependency graph 200 is shown in FIG. 2. A common approach is to push objects whose URLs are embedded in the root HTML (often referred to as the embedding level 1 or "L1" objects). This approach is limited by the fact that L1 objects only constitute a subset of all objects. Moreover, since the HTML might include objects from multiple domains, in practice, not all L1 objects can be pushed. In an execution-based approach, a proxy identifies all objects that the client needs by parsing HTML and CSS, and executing Javascript. The proxy, with much faster network connectivity, and secondarily faster compute, can quickly identify and fetch the objects needed for a client's page load, and proactively push all the objects to the client, so the network delay associated with explicit client requests can be avoided.

Execution-based approaches differ based upon whether a given approach eliminates client Javascript code execution. Eliminating client Javascript code execution has the advantage of reducing client computation related delays, but has associated trade-offs. Regardless of these differences, a common unaddressed challenge to all these designs is the computation scaling bottlenecks associated with execution-based approaches. The concepts and technologies disclosed herein focus, in part, on tackling these challenges in the context of redundant execution approaches, which do not eliminate any client-side execution. Instead, the proxy executes redundantly only for identifying objects needed by the client. As such, the client execution remains unchanged except for seeing faster object fetches. The concepts and technologies disclosed herein focus, in part, on redundant execution given its simplicity and effectiveness in reducing network delay, which dominates cellular client latencies.

Figure 3:
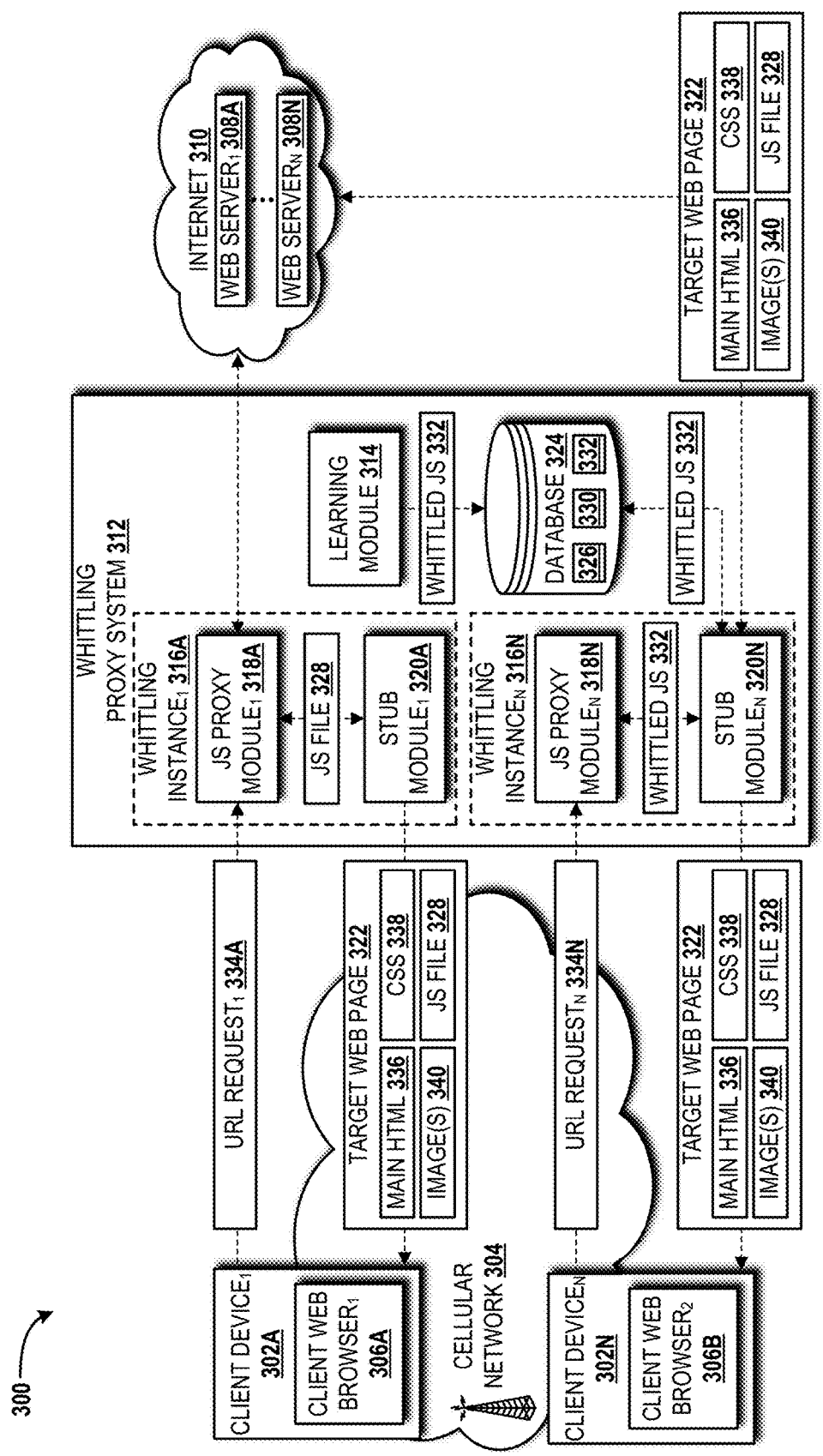
FIG. 3 is a block diagram illustrating aspects of a whittling proxy system architecture, according to an illustrative embodiment.

Referring now to FIG. 3, aspects of an operating environment 300 for various embodiments of the concepts and technologies disclosed herein for scalable whittled proxy execution for low-latency web over cellular networks will be described, according to an illustrative embodiment. The illustrated operating environment 100 includes a plurality of client devices 302A-302N (referred to herein collectively as "client devices 302" or individually as "client device 302") operating in communication with and/or as part of a cellular network 304. The client devices 302 can each include one or more cellular transceivers (best shown in FIG. 18) that enable the client devices 302 to communicate with the cellular network 304 in accordance with one or more cellular telecommunications technologies.

According to various embodiments, the functionality of the client devices 302 can be provided by one or more mobile telephones, smartphones, tablet computers, slate computers, smart watches, smart glasses, other wearable devices, other smart devices, Internet of Things ("IoT") devices, security devices, media playback devices, televisions, set-top devices, navigation devices, connected cars, laptop computers, notebook computers, ultrabook computers, netbook computers, server computers, computers of other form factors, computing devices of other form factors, other computing systems, other computing devices, and/or the like. It should be understood that the functionality of the client devices 302 can be provided by a single device, by two or more similar devices, and/or by two or more dissimilar devices.

The cellular network 304 can include one or more radio access networks ("RANs"; not shown) that operate in accordance with one or more cellular telecommunications technologies, including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular telecommunications technologies, other future 3GPP cellular telecommunications technologies, combinations thereof, and/or the like. The RAN(s) can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the client devices 302. Data communications can be provided, in part, by the RAN(s) using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN can be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will be described in context of the cellular network 304 including one or more RANs operating in accordance with LTE, although those skilled in the art will appreciate the applicability of the concepts and technologies disclosed herein to other cellular telecommunications technologies, including, in particular, those captured within future generation 3GPP standards. Moreover, in some embodiments, the RAN(s) can be or can include one or more virtual RANs ("vRANs").

The cellular network 304 also can include one or more core networks, such as one or more evolved packet core ("EPC") networks. The EPC network(s) can include one or more mobility management entities ("MME"), one or more application servers ("AS"), one or more home subscriber servers ("HSS"), one or more evolved serving mobile location centers ("ESMLC"), one or more gateway mobile location centers ("GMLC"), one or more serving gateways ("SGW"), one or more packet data network gateways ("PGWs"), some combination thereof, and/or the like. These network functions can be implemented as physical network functions ("PNFs") having hardware and software components. The core network components can additionally or alternatively be provided, at least in part, by virtual network functions ("VNFs"). For example, the core network components can be realized as VNFs that utilize a unified commercial-off-the-shelf ("COTS") hardware and flexible resources shared model with the application software for the respective core network components running on one or more virtual machines ("VMs"). An example network virtualization platform ("NVP") architecture that might be used to implement various core network components embodied as VNFs is described herein below with reference to FIG. 21. Moreover, the core network components can be embodied as VNFs in one or more VNF pools, each of which can include a plurality of VNFs providing a particular core network function.

Each of the client devices 302 can execute, via one or more processors (best shown in FIG. 18), a client web browser 306A-306B (referred to herein collectively as "client web browser 306" or individually as "client web browsers 306") to access and view web pages served by a plurality of web servers 308A-308N (referred to herein collectively as "web server 308" or individually as "web servers 308") operating in communication with and/or as part of the Internet 310. The client web browser 306 can intercept client requests and can serve responses pushed by a whittling proxy system 312.

The illustrated operating environment 300 also includes the whittling proxy system 312 operating in communication with or as part of the cellular network 304. The whittling proxy system 312 also is in communication with the web servers 308 operating in the Internet 310. According to one aspect of the concepts and technologies disclosed herein, the whittling proxy system 312 scales proxies based upon redundant execution by addressing the primary computational bottlenecks of existing proxies. Because the functionality of the client web browsers 306, such as object rendering and presentation, is not replicated at the proxy, and because parsing HTML and CSS is relatively light-weight in terms computational resource usage, the dominant portion of proxy computation is the execution of Javascript code. The whittling proxy system 312 leverages the key insight that since proxy execution is redundant, it suffices for the proxy to execute only the Javascript code necessary to fetch objects. The novel, central mechanism of the whittling proxy system 312—whittling—effectively removes Javascript code that does not affect the URLs fetched.

Figure 4:
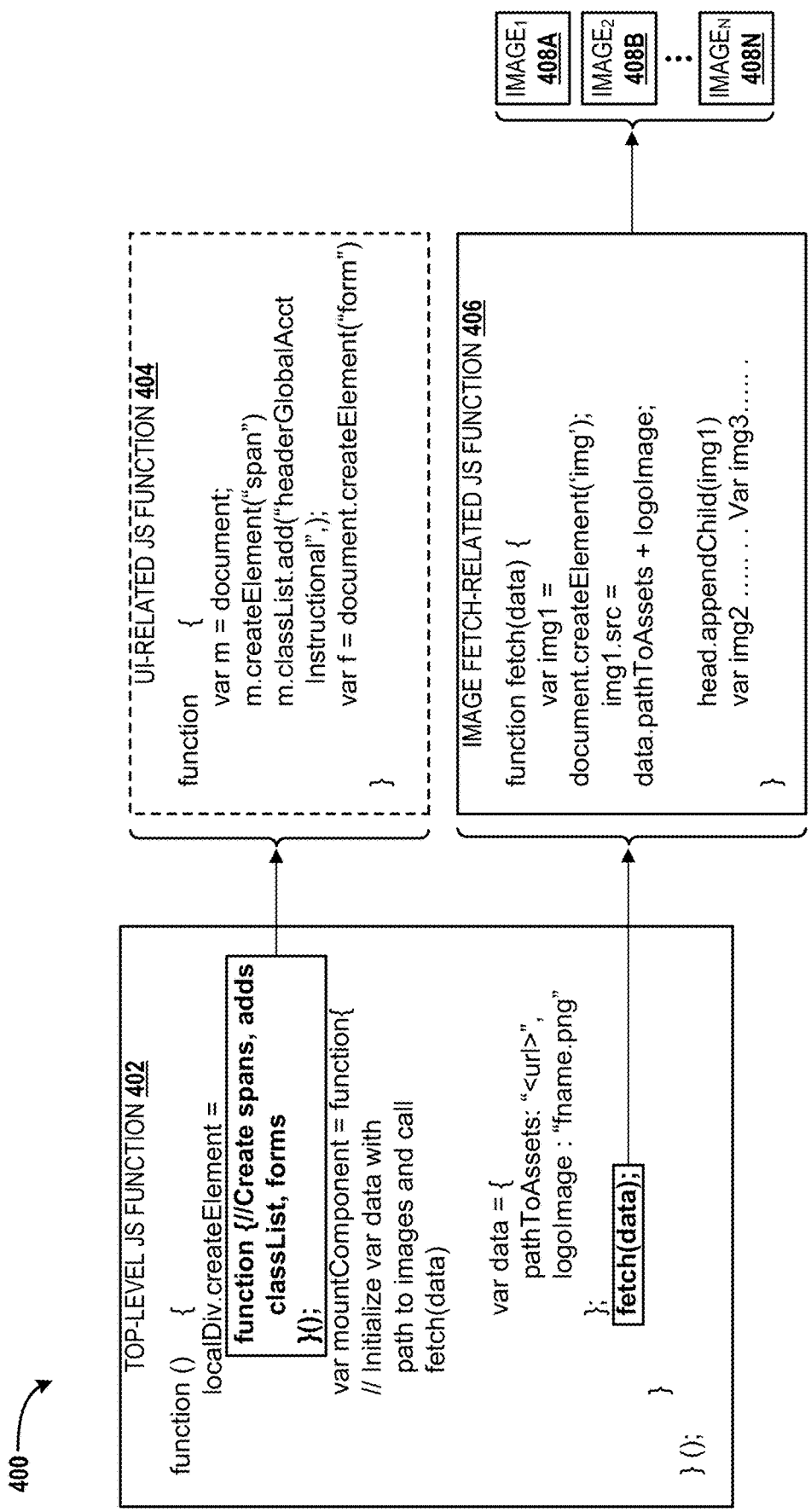
FIG. 4 is a diagram illustrating example programming code for implementing the whittling function described herein, according to an illustrative embodiment.

Referring now to FIG. 4, example Javascript code 400 is shown to illustrate the opportunity for whittling by the whittling proxy system 312, according to an illustrative example. The example Javascript code 400 provides a concrete example of the Javascript code from an example web page selected from the top 100 web pages according to Alexa. In particular, the example Javascript code 400 includes a top-level Javascript function 402 that calls two lower functions—a UI-related Javascript function 404 and an image fetch-related Javascript function 406. The UI-related Javascript function 404 sets up the UI-related aspects of the example web page such as span creation, button creation, and the addition of event listeners to handle button clicks. The UI-related Javascript function 404 does not affect object fetch operations. The image fetching-related Javascript function 406 fetches one or more images 408A-408N, which are displayed in the UI panels created by the UI-related Javascript function 404. The UI-related Javascript function 404 can be whittled by the whittling proxy system 312 without affecting the set of fetched objects. The top-level Javascript function 402 and the image fetch-related Javascript function 406 are in the backward slice of the fetched objects, and therefore should be preserved.

The whittling proxy system 312 use of whittling is related to the area of program slicing. Despite some research promising advances, computing program slices for Javascript code using static analysis techniques remains a hard problem in general. Specifically, Javascript's use of dynamic and eval could result in backward slices with sizes that approach the size of the original program, thereby diminishing the effectiveness of the backward slices in reducing computational overheads (i.e., one of the goals of the whittling proxy system 112).

Returning to FIG. 3, the illustrated whittling proxy system 312 includes a learning module 314 that includes instructions that, when executed by one or more processors (best shown in FIG. 19), cause the whittling proxy system 312 to perform dynamic learning of backward slices, which involves comparing URLs fetched before and after statements of code are dropped. Although such an approach has been explored in other contexts (e.g., finding language-independent program slices and for fault isolation, in context of whittling described herein, this approach presents unique opportunities. Unlike fault isolation where false negatives (i.e., missing a fault) are unacceptable, in the context of whittling, it is acceptable to approximate the backward slice. Such acceptability arises from slicing being performed only on the redundant proxy execution performed by the whittling proxy system 312. Since the client web browser 306 performs the actual full execution, any objects not pushed by the whittling proxy system 312 can be fetched directly by the client device 302, trading off client latency reduction opportunities for computation savings at the whittling proxy system 312.

The illustrated whittling proxy system 312 also includes a plurality of whittling instances 316A-316N (referred to herein collectively as "whittling instances 316" or individually as "whittling instance 316") that, in turn, correspondingly include a plurality of Javascript proxy modules 318A-318N and a plurality of stub modules 320A-320N (referred to herein collectively as "stub modules 320" or individually as "stub module 320"). For each web page that has undergone whittling (i.e., "target web page 322" in the illustrated example), the whittling proxy system 312 maintains, in a database 324, a file name 326 of a Javascript file 328 associated with the target web page 322, an MD5 hash 330 of the content of the Javascript file 328, and a whittled version of the Javascript file 328 (illustrated as "whittled Javascript 332").

The stub module 320 intercepts requests sent by the Javascript proxy module 318 to the web server 308 that serves the target web page 322, as well as responses from the web server 308 to the Javascript proxy module 318. When the Javascript file 328 is fetched, the stub module 320 intercepts the server response, and computes the MD5 hash 330 of the content of the Javascript file 328. The stub module 320 then performs a lookup operation using an index of the database 324 to determine whether a whittled Javascript file with the same hash associated with the target web page 322 is stored in the database 324. If so, the stub module 320 retrieves the whittled version of the Javascript file 328—that is, the whittled Javascript 332—from the database 324 and forwards the whittled Javascript 332 to the Javascript proxy module 318, which executes the whittled Javascript 332. The stub module 320 also pushes the original, unwhittled Javascript code—that is, the Javascript file 328—to the client web browser 306.

The MD5 hash 330 of the Javascript file 328 is used instead of just the file name 326 of the Javascript file 328 to ensure that the Javascript code content associated with the file name 326 did not change, and to maximize the reuse of whittling in cases where the same Javascript code content is fetched across runs/iterations but with slightly different URLs (a common scenario in web downloads). In some cases, a particular Javascript file might have undergone minor changes and functions that can be whittled in the original Javascript code and might still be capable of being whittled in the modified Javascript code. As an optimization, the index of the database 324 can store a list of functions that can be whittled for each Javascript file 328. When the stub module 320 receives a particular Javascript file 328 that shares the same file name as an indexed Javascript file 328 but with a different hash, the stub module 320 whittles away functions listed in the index. While this involves some online modifications to that Javascript file 328, the overheads of such modifications are modest.

The whittling proxy system 312 can emulate the environment provided by the client web browser 306 executing on the client device 302. In particular, the whittling proxy system 312 can emulate parameters such as the User-Agent, screen width and height, viewport settings, and CSS3 media query parameters (e.g., devicePixelRatio), since the requested URLs might depend upon one or more of these parameters. To achieve this, the whittling proxy system 312 can use page application programming interfaces ("APIs"), such as, for example, page.settings.userAgent and page.viewportSize that are supported by the Javascript proxy module 318. This is supported by the client web browser 306, which sends these parameters when the client web browser 306 connects to the Javascript proxy module 318 and requests the URL for the target web page 322, such as in a URL request 334. The Javascript proxy module 318 dynamically creates a page object, and sets these parameters as object properties. Further, the Javascript proxy module 318 tracks the state of the objects (cache and cookies) stored at the client device 302. This enables the right objects to be fetched and avoids transferring objects that are already cached at the client device 302.

The whittling proxy system 312 can support HTTP and HTTPS. For the latter, HTTPs requests can be handled if users trust the whittling proxy system 312. Such trust can be facilitated by personalized proxies. Alternatively, HTTPS can be extended to allow middleboxes to read and/or modify parts of the data, and this extension can be adopted by the whittling proxy system 312.

The client web browser 306 accepts URLs input by a user, generates the URL request 334 directed only to the main HTML 336 of the target web page 322, and forwards the URL request 334 to the whittling proxy system 312. Further requests are intercepted and queued by the client web browser 306. The client web browser 306 waits for responses pushed by the whittling proxy system 312, and when a response is received, the client web browser 306 matches the response with a queued request if one exists. The whittling proxy system 312 sends a flag to the client web browser 306 once all objects required for the initial load of the target web page 322 have been pushed to the client web browser 306. Upon receiving the flag, the client web browser 306 then contacts the web server 308 that serves the target web page 322 for any remaining objects needed for the page load, such as the CSS 338, and the images 340.

Figure 5:
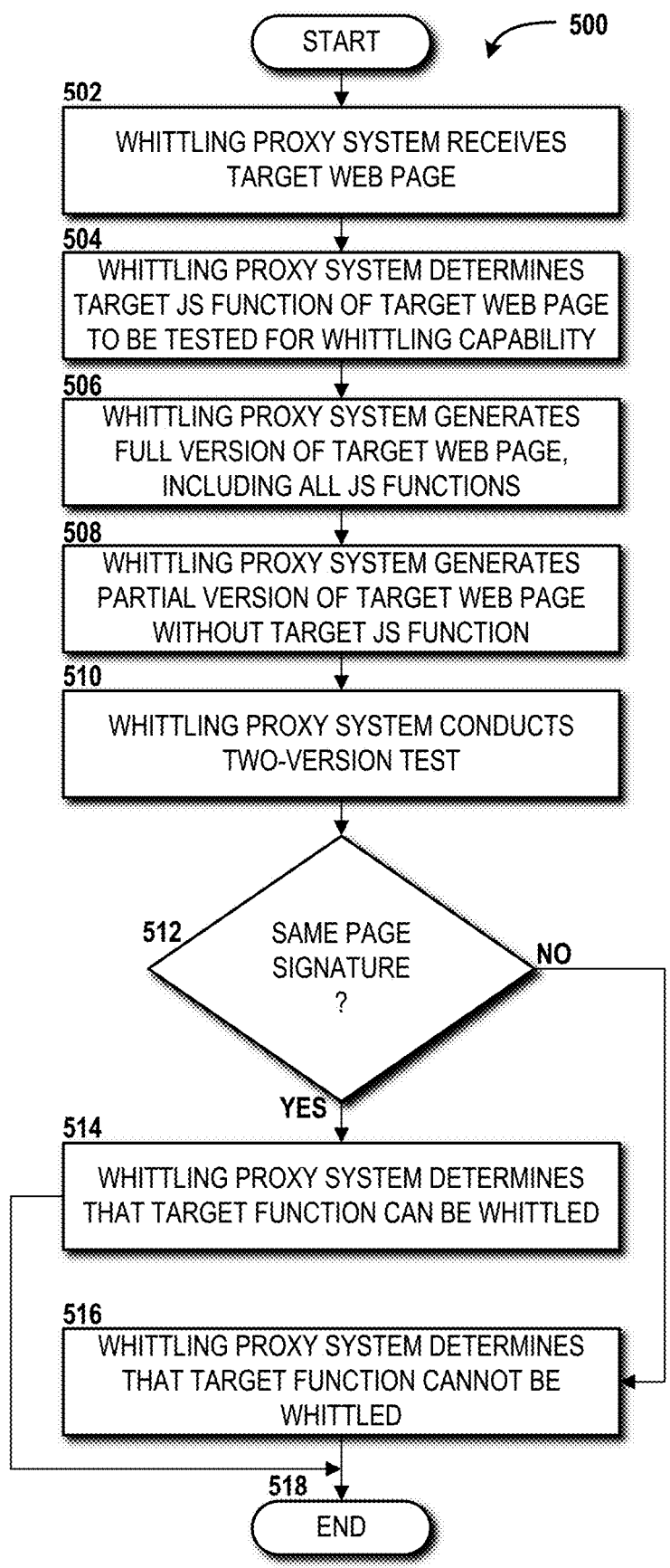
FIG. 5 is a flow diagram illustrating aspects of a method for whittling individual Javascript functions, according to an illustrative embodiment of the concepts and technologies disclosed herein.

Turning now to FIG. 5, aspects of a method 500 for whittling individual Javascript functions will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, servers, routers, switches, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor or other processing component(s) disclosed herein to perform operations. It should be understood that the performance of one or more operations may include operations executed by one or more virtual processors at the instructions of one or more of the aforementioned hardware processors.

In the embodiments disclosed herein, the whittling proxy system 312 whittles Javascript code at the function granularity. The choice of function granularity is driven by the opportunity-overhead trade-off. In alternative embodiments, by choosing fine-granularity (e.g., statements) instead, the whittling proxy system 312 has the ability to whittle additional code, but might increase the computational overhead because each statement might have to be individually tested. On the other hand, coarse-grained whittling of entire Javascript files results in minimal benefits as most Javascript files cannot be whittled if even a single function affects object loading. Further, the relatively few Javascript files that can be whittled are typically rarely-executed files that do not result in significant savings even if whittled. It should be noted that whittling eliminates all dynamic invocations of the functions. For this reason, the whittling proxy system 312 can be programmed to be conservative in function whittling such that if even one invocation of the function affects URL fetches, the function will not be whittled.

The method 500 will be described with reference to FIG. 5 and further reference to FIG. 3. The method 500 begins and proceeds to operation 502, where the whittling proxy system 312 receives the target web page 322. From operation 502, the method 500 proceeds to operation 504, where the whittling proxy system 312 determines a target Javascript function in the Javascript file 328 of the target web page 322 to be tested for whittling capability (i.e., can the target Javascript function be safely whittled).

From operation 504, the method 500 proceeds to operation 506, where the whittling proxy system 312 generates a unmodified, full version (also referred to herein as "F" version) of the target web page 322, including all Javascript functions in the Javascript file 328 of the target web page 322. From operation 506, the method 500 proceeds to operation 508, where the whittling proxy system 312 generates a modified, partial version (also referred to herein as "P" version) of the target web page 322 without the target Javascript function. The whittling proxy system 312 generates the P version of the target web page 322 by eliding the target Javascript function to be an empty function.

From operation 508, the method 500 proceeds to operation 510, where the whittling proxy system 312 conducts a test to determine if the target Javascript function can be safely whittled while ensuring that all objects needed to load the target web page 322 are fetched. From operation 510, the method 500 proceeds to operation 512, where the whittling proxy system 312 determines if the F version and the P version have the same page signature. That is, the whittling proxy system 312 determines if both version identify the same set of objects for downloading. If, at operation 512, the whittling proxy system 312 determines that both the F version and the P versions identify the same set of objects for downloading, the method 500 proceeds to operation 514, where the whittling proxy system 312 determines the target Javascript function can be whittled because eliding the target Javascript function does not affect the objects. In other words, the page signatures of the F version and the P version are the same. If, however, at operation 512, the whittling proxy system 312 determines that both the F version and the P version identify a different set of objects for downloading (i.e., the page signatures of the F version and the P version are different), the method 500 proceeds to operation 516, where the whittling proxy system 312 determines that the target Javascript function cannot be whittled. From operation 514 or operation 516, the method 500 proceeds to operation 518, where the method 500 ends.

Determining the set of objects fetched by the F version poses interesting issues, since multiple interpretations are possible regarding when a page load is considered complete. Nominally, a page load can be considered complete based upon time bounds (e.g., after 30 seconds). Alternatively, recognizing that objects needed for an initial acceptable rendering of a page are more critical to the user experience that other objects, a page might be considered complete based upon browser events (e.g., when the browser onLoad event_res), when all above-the-fold content is loaded, or when content with the highest utility to users is received.

The whittling proxy system 312 is agnostic about the metric of page load completion; however, for any chosen metric, an appropriate signature can be extracted, which is the subset of objects fetched by the F version that serves as a baseline of comparison for the whittling tests. To be clear, in some embodiments, the whittling proxy system 312 uses the browser onLoad event to determine page completion. The whittling proxy system 312 can run the F version multiple times until onLoad and use the intersection set of objects fetched in each run as the signature of the page. In this manner, the signature only contains objects always fetched before onLoad. It should be noted that, in any given run, additional URLs might be fetched incidentally as a consequence of asynchronous Javascript. Those skilled in the art will appreciate that the whittling proxy system 312 can be extended to accommodate other notions of page completeness.

The aforementioned test outcome determines whether a specific Javascript function can be safely whittled (i.e., the signature matches) or not (i.e., there is a mismatch). It should be noted that even in cases where there is a match, there might be other side effects due to function whittling. For example, whittling a function might give rise to errors because some objects that are to be defined in the whittled function are undefined. Such errors impose some minimal overheads as the errors should be caught/handled. Moreover, such errors do not affect the testing technique utilized herein because the focus is solely on whether all the objects in the signature are fetched, and the overheads of error handling are considered in measurements.

The whittling proxy system 312 can perform testing in a recorded environment. The first access to the page by the whittling proxy system 312 (where all Javascript is executed) is recorded, and all testing of Javascript subsets occurs by replaying the recorded page in a deterministic manner. As such, the whittling tests are not impacted by randomization, and date/time-dependent code, which might complicate ascertaining whether the difference between F and P versions are because of whittling or because of variability.

The method 500 describes how the whittling proxy system 312 can test any individual Javascript function to determine if it can be whittled. The method 500 can be used to test all Javascript functions in the target web page 322, but this approach has two weaknesses. First, web pages often have hundreds of Javascript functions, many of which are rarely invoked. Testing all Javascript functions increases overheads without commensurate benefits. Second, there are often dependencies among Javascript functions that prevent collective whittling of multiple functions even though each function can be whittled individually.

Figure 6:
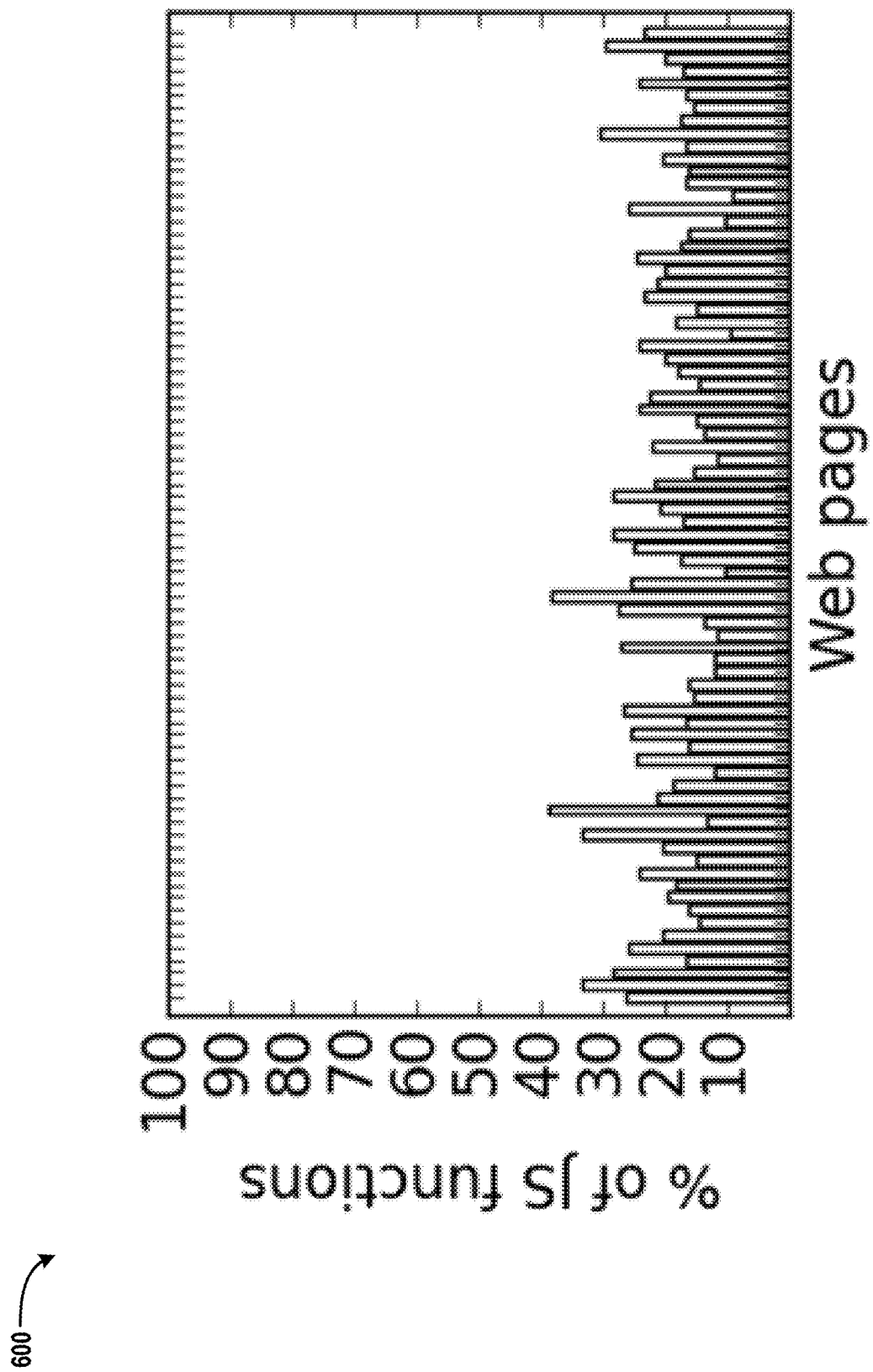
FIG. 6 is a bar chart illustrating the percentage of Javascript functions that account for 80% of total Javascript execution time, according to example experimental results.

To avoid testing all Javascript functions, the whittling proxy system 312 can employ a greedy heuristic by sorting functions in the order of each function's execution time. The whittling proxy system 312 can measure the execution time done in each function by profiling a full Javascript execution. By testing functions in this manner, the whittling proxy system 312 can maximize the potential computational savings from whittling. The greedy order is especially effective because, on average, 20% of Javascript functions account for 80% of total Javascript execution time across all Alexa top 100 pages. FIG. 6 is a bar chart 600 illustrating the percentage of functions accounting for 80% of total Javascript execution time. Uniformly, it can be observed that a small percentage (9%-38%) of the web pages is sufficient to account for 80% of execution time. This 80-20 rule enables the whittling proxy system 312 to limit whittling to this percentage.

Handling dependencies among Javascript functions will now be described. By way of example, if Javascript code contains two Javascript functions (e.g., functions A and B) both of which invoke the jQuery initializer. The jQuery initializer invocation impacts other URL-fetching code and hence is needed. The other work in functions A and B is not relevant for any URL fetch. When doing the basic whittling test, the whittling proxy system 312 determines that each function is individually safe to whittle because the jQuery initializer is still invoked in the other function. However, when both functions are whittled, the jQuery initializer is never invoked, which affects other parts of the Javascript code that fetch URLs.

The above example is one of many possible dependencies that prevent whittling of large collections of Javascript functions. Because such dependencies are hard to analyze, the whittling proxy system 312 can utilize an empirical approach. Specifically, the whittling proxy system 312 can use the greedy order of function testing to grow a set of functions that can be turned off together. An example implementation of this greedy algorithm will now be described with reference to FIGS. 7 and 8A-8B.

When whittling individual Javascript functions, the whittling proxy system 312 can obtain the original page without issue. However, when the whittling proxy system 312 whittles a pair of Javascript functions or a set of Javascript functions, the whittling proxy system 312 might not obtain the equivalent of the original page. The whittling proxy system 312 can implement a greedy approach where the whittling proxy system 312 does not whittle the latest Javascript function if it causes a change in the page. This approach also helps performance because the whittling proxy system 312 sorts in the order of computation load (e.g., execution time). So, by not whittling the latest Javascript function, the whittling proxy system 312 retains a less computation heavy Javascript function than a previous Javascript function. It also allows the whittling proxy system 312 to ignore finding the Javascript function(s) that together with the latest Javascript function have a dependency.

Figure 7:
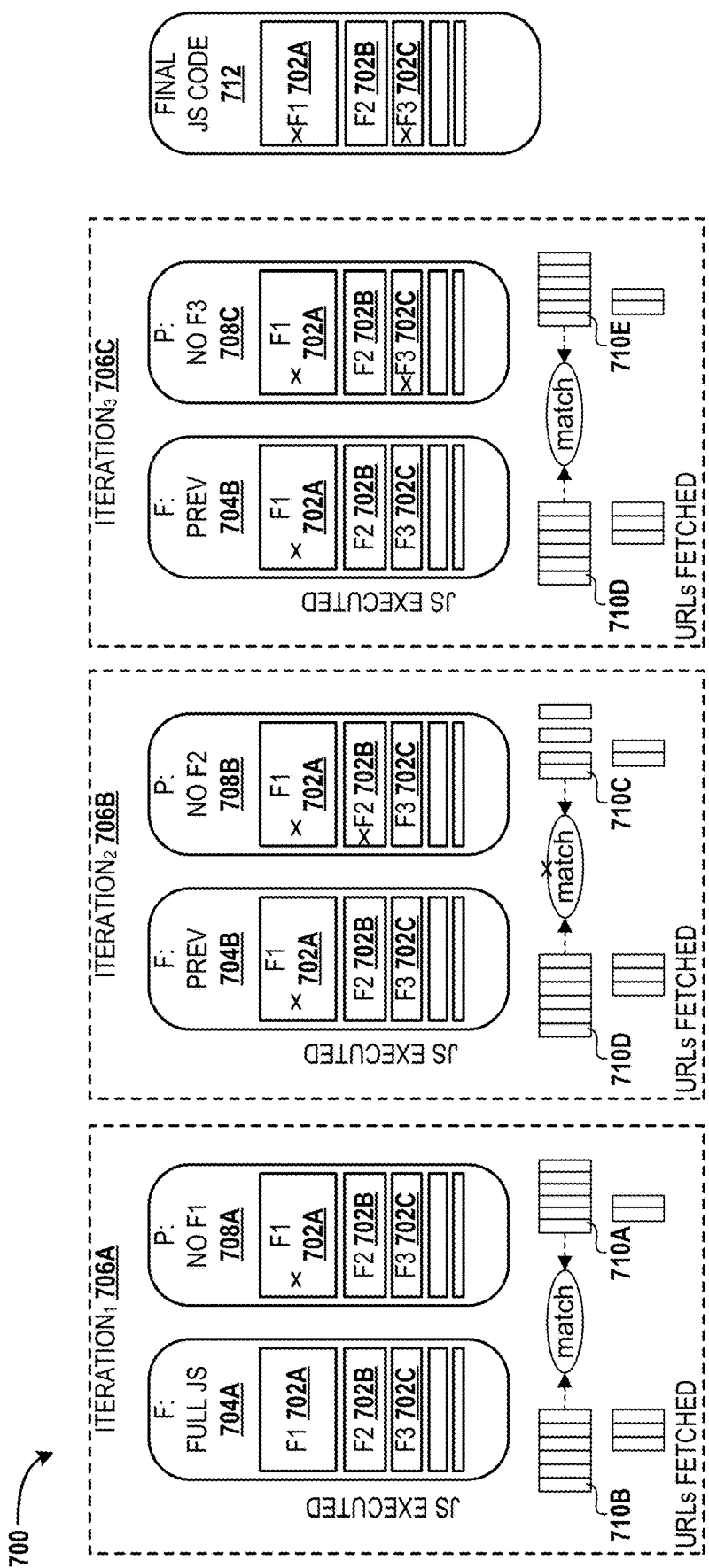
FIG. 7 is a diagram illustrating an example of greedy whittling, according to an illustrative embodiment of the concepts and technologies disclosed herein.

Turning now to FIG. 7, an example of greedy whittling 700 will be described, according to an illustrative embodiment. FIG. 7 assumes a web page with Javascript code to be executed ("Javascript executed" in the illustrated example). The Javascript code includes a plurality of Javascript functions 702A-702C that are pre-sorted in decreasing order of computational effort—that is, ƒ1 702A, ƒ2 702B, and ƒ3 702C. Although only three Javascript functions are shown, the whittling proxy system 312 is not limited to a specific number of Javascript functions to be tested, and therefore, the illustrated example should not be construed as being limiting in any way. The whittling proxy system 312 starts with a test against the full web page load, which includes execution of all Javascript functions. This is shown as a first F version ("F: full JS") 704A in a first iteration 706A performed by the whittling proxy system 312. If a first P version ("P: No f1") 708A that whittles the function ƒ1 702A results in a first signature 710A that is the same as a second signature 710B of the first F version ("F: Full JS") 704A, the function ƒ1 702A is whittled/dropped from future iterations a second iteration 706B and a third iteration 706C. Subsequent functions (function ƒ2 702B and function ƒ3 702C) are further tested to determine if these functions can be whittled in conjunction with all previously-whittled functions. These secondary tests are an alternative test in which the F version is the Javascript code without all previous functions that can be safely whittled (as determined by previous tests) and the P version that drops the new function that is under test. For example, in the second iteration 706B, a second F version ("F: Prev") 704B whittles the function ƒ1 702A because the function ƒ1 702A is known to be safe to drop from the previous iteration (i.e., the first iteration 706A). A second P version 708B additionally drops the function ƒ2 702B to test if the function ƒ2 702B can be safely whittled. Functions that can be dropped without impacting the page signature are marked for whittling; other functions remain in the executed Javascript. In FIG. 7, the function ƒ2 702B cannot be whittled because a third signature 710C does not match a fourth signature 710D when the function ƒ2 702B is dropped, but the function ƒ3 702C can be whittled. In the third iteration 706C, a third P version 708C additionally drops the function ƒ3 702C to test if the function ƒ3 702C can be safely whittled. The function ƒ3 702C can be whittled because a fifth signature 710E matches the fourth signature 710D. This process continues to whittle the Javascript code until all functions under consideration for whittling are tested resulting in final Javascript code 712. This greedy approach has the added advantage of minimizing the overheads of dynamic learning as the heavier functions are whittled for a large fraction of tests. As a practical matter, implementations might choose to filter the set of functions that are considered based upon (a) minimum work threshold, to avoid examining light functions that do not provide significant benefits, and (b) numerical limits, to bound the time overheads of whittling. In practice, the whittling proxy system 312 can test up to 200 of the top functions until 80% of the computational work is accounted for.

The greedy heuristic strategy does not allow for backtracking (e.g., by bringing back a dropped function); the set of dropped functions starts with the heaviest function that can be whittled and can only grow by adding other functions that can be whittled without dependency problems. As such, the result might not be optimal. However, as will be shown herein below, the greedy heuristic is effective in practice. More sophisticated techniques to identify collections of functions that might be simultaneously whittled can be implemented to improve the results provided by the whittling proxy system 312.

Figure 8A:
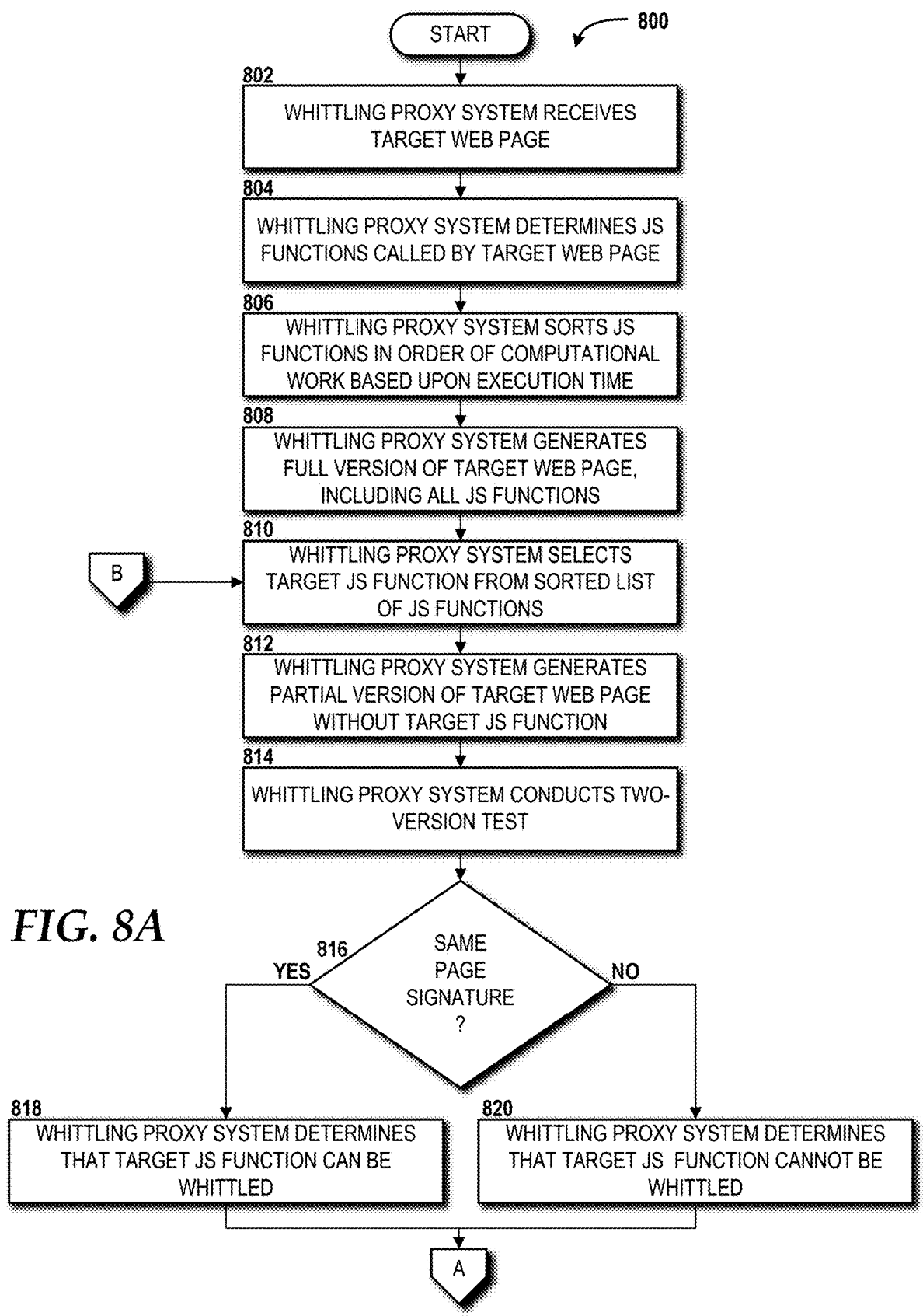
FIGS. 8A-8B are flow diagrams illustrating aspects of a method for whittling across functions, according to an illustrative embodiment of the concepts and technologies disclosed herein.
Figure 8B:
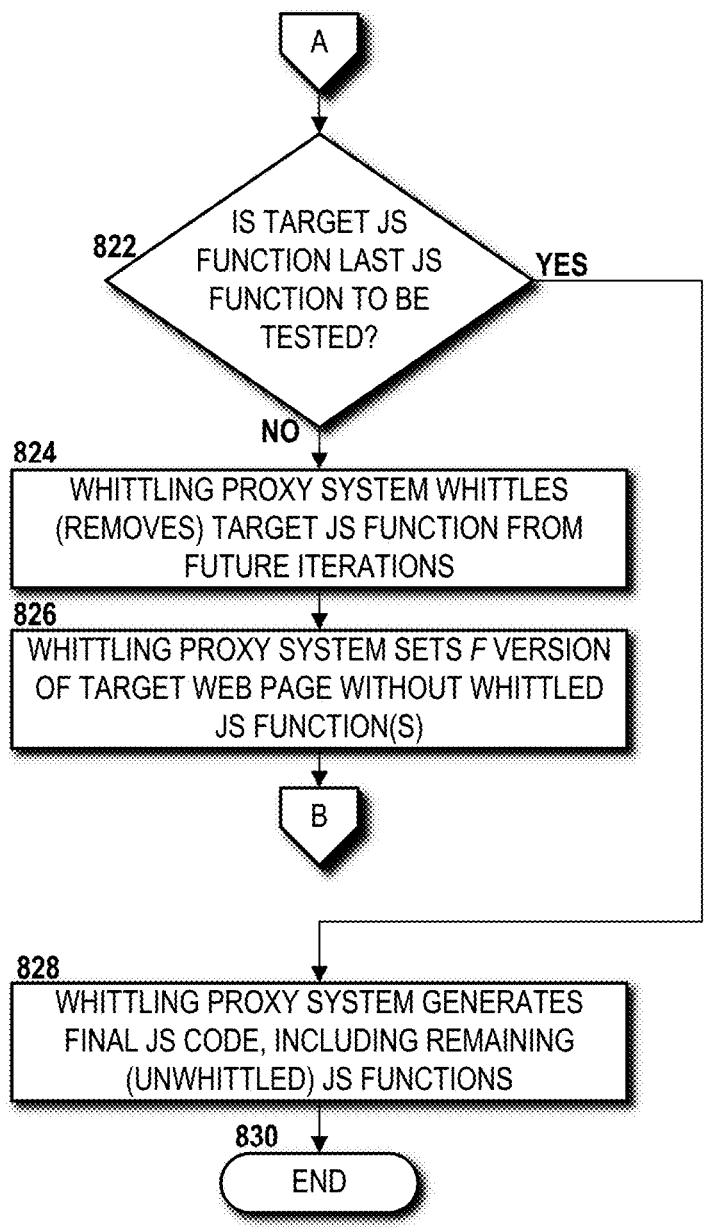

Turning now to FIGS. 8A-8B, a method 800 for whittling across multiple functions will be described, according to an illustrative embodiment. The method 800 begins and proceeds to operation 802, where the whittling proxy system 312 receives the target web page 322. From operation 802, the method 800 proceeds to operation 804, where the whittling proxy system 312 determines the Javascript functions (in the Javascript file 328) called by the target web page 322. From operation 804, the method 800 proceeds to operation 806, where the whittling proxy system 312 sorts the Javascript functions in order of computational work based upon execution time to create a sorted list of Javascript functions.

From operation 806, the method 800 proceeds to operation 808, where the whittling proxy system 312 generates a full version ("F version") of the target web page 322, including all Javascript functions in the sorted list of Javascript functions. From operation 808, the method 800 proceeds to operation 810, where the whittling proxy system 312 selects a target Javascript function from the sorted list of Javascript functions. From operation 810, the method 800 proceeds to operation 812, where the whittling proxy system 312 generates a partial version ("P version") of the target web page 322 without the target Javascript function.

From operation 812, the method 800 proceeds to operation 814, where the whittling proxy system 312 conducts a test to compare the F version of the target web page 322 to the P version of the target web page 322. From operation 814, the method 800 proceeds to operation 816, where the whittling proxy system 312 determines whether the test resulted in the same page signature (e.g., the page signature 710A in FIG. 7). If the test resulted in the same page signature, the method 800 proceeds to operation 818, where the whittling proxy system 312 determines that the target Javascript function can be whittled. If, however, the test resulted in a different page signature (e.g., the page signatures 710B, 710C in FIG. 7), the method 800 proceeds to operation 820, where the whittling proxy system 312 determines that the target Javascript function cannot be whittled. From either operation 818 or operation 820, the method 800 proceeds to operation 822 shown in FIG. 8B.

At operation 822, the whittling proxy system 312 determines if the target Javascript function is the last Javascript function in the sorted list of Javascript functions to be tested. If the target Javascript function is not the last Javascript function in the sorted list of Javascript functions to be tested, the method 800 proceeds to operation 824, where the whittling proxy system 312 whittles (i.e., removes) the target Javascript function from future iterations (e.g., the iterations 706B, 706C in FIG. 7). From operation 824, the method 800 proceeds to operation 826, where the whittling proxy system 312 sets the F version of the target web page 322 to the target web page 322 without the Javascript function whittled at operation 824. From operation 826, the method 800 returns to FIG. 8A, and in particular, to operation 810, where the whittling proxy system 312 selects a new target Javascript function from the sorted list of Javascript functions, and the method 800 proceeds as described above. Returning to FIG. 8B, if the target Javascript function is the last Javascript function in the sorted list of Javascript functions to be tested, the method 800 proceeds to operation 828, where the whittling proxy system 312 generates final Javascript code (e.g., the final Javascript code 712 in FIG. 7), including any remaining (i.e., unwhittled) Javascript functions. From operation 828, the method 800 proceeds to operation 830, where the method 800 ends.

The process of dynamically learning the whittled Javascript functions depends on (1) the number of functions, which ranges from the low 10 s to 200, and (2) the time for each per-function test, which is typically a few seconds because each test is a page load (0.3-4 s) followed by signature comparison (<10 ms). For the evaluation set of web pages from Alexa top 100, the average learning time is 213 seconds across pages.

Figure 9:
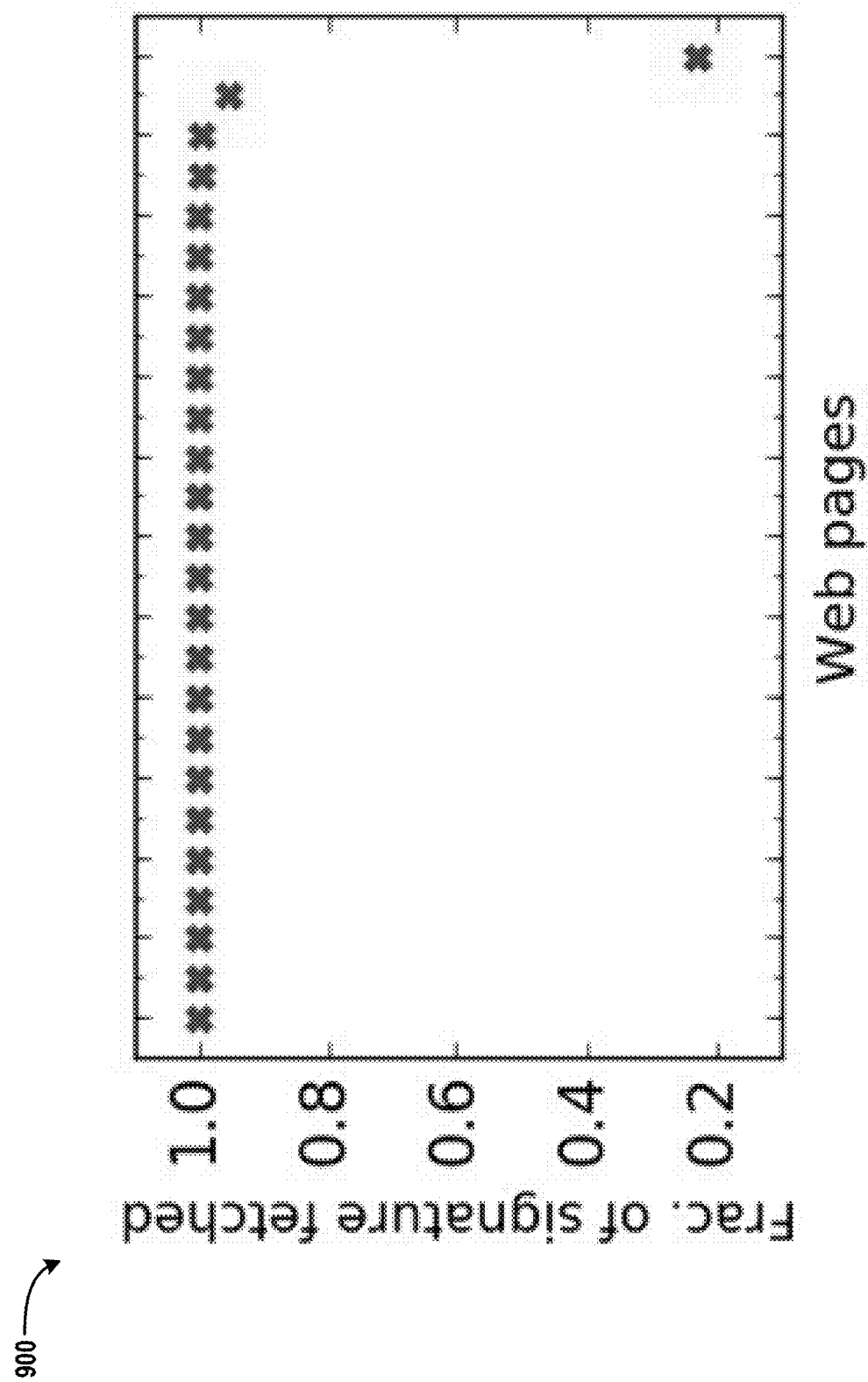
FIG. 9 is a scatter plot chart of the fraction of signature URLS fetched by whittled Javascript at time t=24 hours using whittling learnt at t=0, according to example experimental results.

In some embodiments, the dynamic learning of Javascript whittling is not done for every page load. Rather, the whittling proxy system 312 performs whittling for the first page load, and then re-uses the whittled code for all the common Javascript content in a new load. In the forthcoming description, an empirical study showing the feasibility of such reuse will be described. The study is based on a recording of 25 pages from the Alexa top 100 obtained every hour over a 24 hour period. For each page, the whittling proxy system 312 whittled Javascript based on the version recorded at time t=0. The signature (the set of objects needed for page load) is extracted for the t=24 hr recording based on a full execution of all Javascript in that recording. The whittling proxy system 312 determines the fraction of objects in the signature fetched by the whittled Javascript code using whittling learnt at t=0. Turning now to FIG. 9, a scatter plot chart 900 of the fraction of signature URLs fetched by whittled Javascript at time t=24 hours using whittling learnt at t=0 is shown, according to an illustrative example. In the scatter plot chart 900, all but 2 pages, 99% of the signature or higher can be fetched, indicating whittling reuse is effective even over a 24 hour period for most pages.

Figure 10:
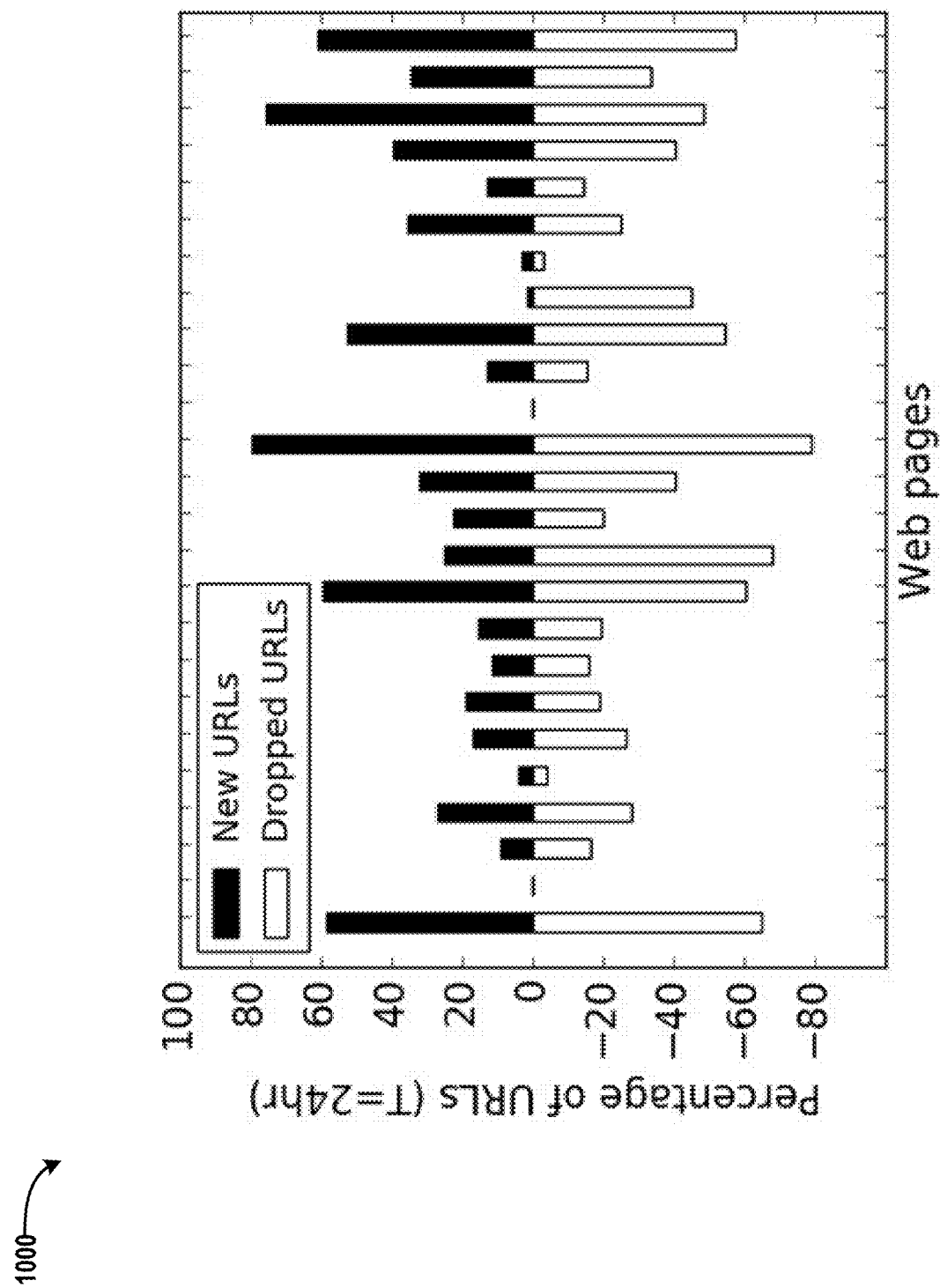
FIG. 10 is a bar chart illustrating the percentage of new and dropped URLs in the web page signature at t=24 hours compared to t=0, according to example experimental results.

It should be noted that while the Javascript code is stable, the page content is not. Turning now to FIG. 10, a bar chart 1000 illustrating the percentage of new and dropped URLs in the web page signature at t=24 hours compared to t=0 is shown, according to an illustrative example. The bar chart 1000 shows the incremental differences in the page signatures at time t=0 and t=24 hr for the pages on the Y-axis. Objects that are fetched at t=24 hr that were not present at t=0 are shown on the positive side. Objects that were fetched at t=0 that were absent at t=24 hr are shown on the negative side. Even though there is significant churn in the web page content over a period of 24 hours, executing the same 24-hour-old whittled Javascript is effective at fetching the changed content. In practice, the whittling proxy system 312 can be configured to relearn whittling over more frequent time intervals. For instance, reusing whittled code over a 3-hour window results in under 2% over-head (2%=213 secs/(3 hr×3600 secs/hr)), for a learning time of 213s discussed above. Even for a page that has more frequent changes, changing the learning frequency of the whittling proxy system 312 to once every 3 hours results in a larger fraction of objects being fetched.

For pages with dynamically changing Javascript, the whittling proxy system 312 might lose some of the CPU savings from whittling (and the resulting throughput improvement at the proxy) because the functions identified for whittling might not be present in the changed Javascript. To evaluate this concern, the fraction (%) of functions (X-Axis) can be whittled based on the t=0 version, which are still relevant for whittling at a later time across the pages. For the t=3 hr page load, for 75% of pages, all functions can be whittled, while for another 15% of pages over 70% of functions can be whittled. It should be noted, however, that client latency is not affected for most pages because the proxy fetches and pushes all objects obtained from its Javascript execution. Overall, these results show that it is viable to reuse whittling over a 3-hour window of time while still retaining most of the benefits.

The evaluation methodology described herein compares the whittling proxy system 312 with FullRedEx, a proxy that currently performs fully redundant execution of all Javascript code. The evaluation methodology shows the effectiveness of the whittling proxy system 312 in supporting more user requests per second by reducing Javascript computation at the proxy through whittling, and the ability of the whittling proxy system 312 to preserve the latency benefits of FullRedEx.

Since web pages change over time, and to minimize the impacts of variable server load, the evaluation methodology uses an open source record and replay tool called web-page-replay ("WPR") to emulate a real web server, such as one of the web servers 308. WPR was used to record entire web pages, including all constituent objects, by downloading from the actual web server(s). The recording was then replayed across all the experiments described herein. The pages were recorded using a cellular phone to ensure that the mobile version of the page was recorded. It should be noted that many pages do not have separate desktop and mobile pages, but use CSS3 media queries to tailor the rendering of the page content for different devices. In either case, the correct version of the page for the cellular phone was recorded. For the whittling proxy system 312, a commonly used Javascript formatting tool can be used to ensure that Javascript functions, including anonymous Javascript functions, can be unambiguously identified by their line numbers to facilitate whittling.

The evaluation methodology described herein used the Alexa top 100 US sites. The final evaluation described herein, however, used 78 web pages for two reasons. First, a large number of experiments were conducted with each web page, and found that ten pages did not trigger onLoad in a large fraction of the experiments. These pages were excluded from the evaluation. Second, the first step in whittling is to identify the most computationally intensive Javascript. While the whittling proxy system 312 is based on PhantomJavascript, native profiler support for Phantom-Javascript is not available. Consequently, the evaluation methodology described herein uses the CHROME V8 profiler. Using CHROME for profiling, and PhantomJavascript for slice testing and proxy implementation sometimes resulted in differences in files fetched and functions executed. Consequently, functions indicated by the profiler sometimes could not be matched to appropriate functions in the Javascript code.

This resulted in two issues: First, for 12 pages, none of the Javascript functions identified by the profiling step matched those actually executed by PhantomJavascript. These pages also were excluded from the evaluation. Second, for all pages, a subset of functions identified by the profiler step could not be tested for whittling, thus limiting the amount of computation that can be saved through whittling. Fortunately, the issues here are not fundamental to the concept of whittling disclosed herein. The availability of native PhantomJavascript profiling support can both expand the set of pages suitable for testing, as well as potentially improve the fraction of compute saved for all pages.

The evaluation methodology measures the request throughput (i.e., the number of user requests per second) under load that can be served by each of the whittling proxy system 312 and FullRedEx. Since during the evaluation the number of mobile clients needed to generate a sufficient load for meaningful request throughput measurements were not available, the evaluation uses synthetically generated simultaneous user requests to saturate the proxy CPU by running many parallel instances of PhantomJavascript. The requests from the PhantomJavascript instances were load balanced across five WPR servers. A commodity desktop with a processor running at 3.60 GHz and 16 GB RAM was used to run the proxies—SPDY, FullRedEx, and the whittling proxy system 312—so that the number of WPR servers needed to handle the load was small. The evaluation methodology accounted for impacts of initial ramp up and the final ramp down times by running the experiment for a sufficient duration. This experiment was run across all 78 web pages. The number of instances of PhantomJavascript and the number of requests served by each instance for each web page were tuned to ensure that the CPU was saturated for both the whittling proxy system 312 and FullRedEx.

To capture real-world impacts of cellular networks, latency comparison experiments were performed using a smartphone downloading web pages over a live LTE network. In this experiment, performance of the whittling proxy system 312 was compared to both FullRedEx and HTTP/1.1 browser (which is referred to as "baseline") and to SPDY using a proxy (which is referred to as "SPDY"). The proxy honored the default SPDY priorities (i.e., HTML>CSS & Javascript>images) set by the browser.

The performance of the whittling proxy system 312 also was compared to an approach that parses only the main HTML of a web page and pushes all objects embedded in the main HTML (which is referred to as "Push_HTMLEmbed."). Push_HTMLEmbed was used to generalize SPDY's server push when configured with the commonly used embedding level 1 policy. Push_HTMLEmbed provides an upper bound on the latency benefits of the above SPDY push approach because it also allows for pushing objects spread across multiple domains whereas a SPDY server can push objects only in its domain.

Ideally, the proxies would run in the packet core of a cellular network. Since this was not feasible during the experiments summarized herein, an instance of each proxy was run on an Internet-facing server. To account for the delay from the packet core of the cellular network to a typical web server, a round trip delay of 20 ms was introduced between the proxies and the WPR server. To account for the fact that cellular networks use HTTP proxies, the same delay was introduced for Baseline at the WPR end. This 20ms delay was selected based upon measurements of delay when fetching the Alexa top 100 web pages from a desktop client.

The experiments also ensured that only a single user request was served at any time with all the schemes. A lightly-loaded setup was used since a focus of the experiments was on evaluating the impact on latency by reducing Javascript computation work at the proxy through whittling. Unlike request throughput measurements, latency measurements require light loading to be meaningful. In practice, these proxy schemes likely would be provisioned with sufficient proxy servers to ensure small queuing delays.

The proxy schemes were compared both with respect to OLT and Speed Index. Speed Index is a measure of how quickly a web page's content renders on a screen. Speed Index calculates the completeness of a page at various points during the page load. The completeness itself is measured by comparing the distribution of colors at any instant with the final distribution after the page load. A video of the page load was captured in each of the experiments using a screen record utility of a smartphone. Then, a webPageTest's visual metrics tool was used to analyze the videos and to generate the Speed Index metric.

Results of the aforementioned experiments will now be described. First, the effectiveness of the whittling proxy system 312 in supporting more user requests per second than FullRedEx, whose performance is representative of prior fully redundant execution schemes, will be described.

Since a proxy would be serving multiple web pages in practice, the scaling benefits of the whittling proxy system 312 depend on a combination of (i) the popularity of pages; and (ii) the savings with the whittling proxy system 312 for each page. Formally, the overall benefits with the whittling proxy system 312 can be computed as:

$$(\Sigma_i f_i \times (1/R_{if}))/(\Sigma_i f_i \times (1/R_{in})) \qquad (1),$$

where $f_i$ is the fraction of requests for page i, while $R_{if}$ and $R_{in}$ are the number of requests per second that can be served for page i under load with FullRedEx and the whittling proxy system 312 respectively.

Figure 11:
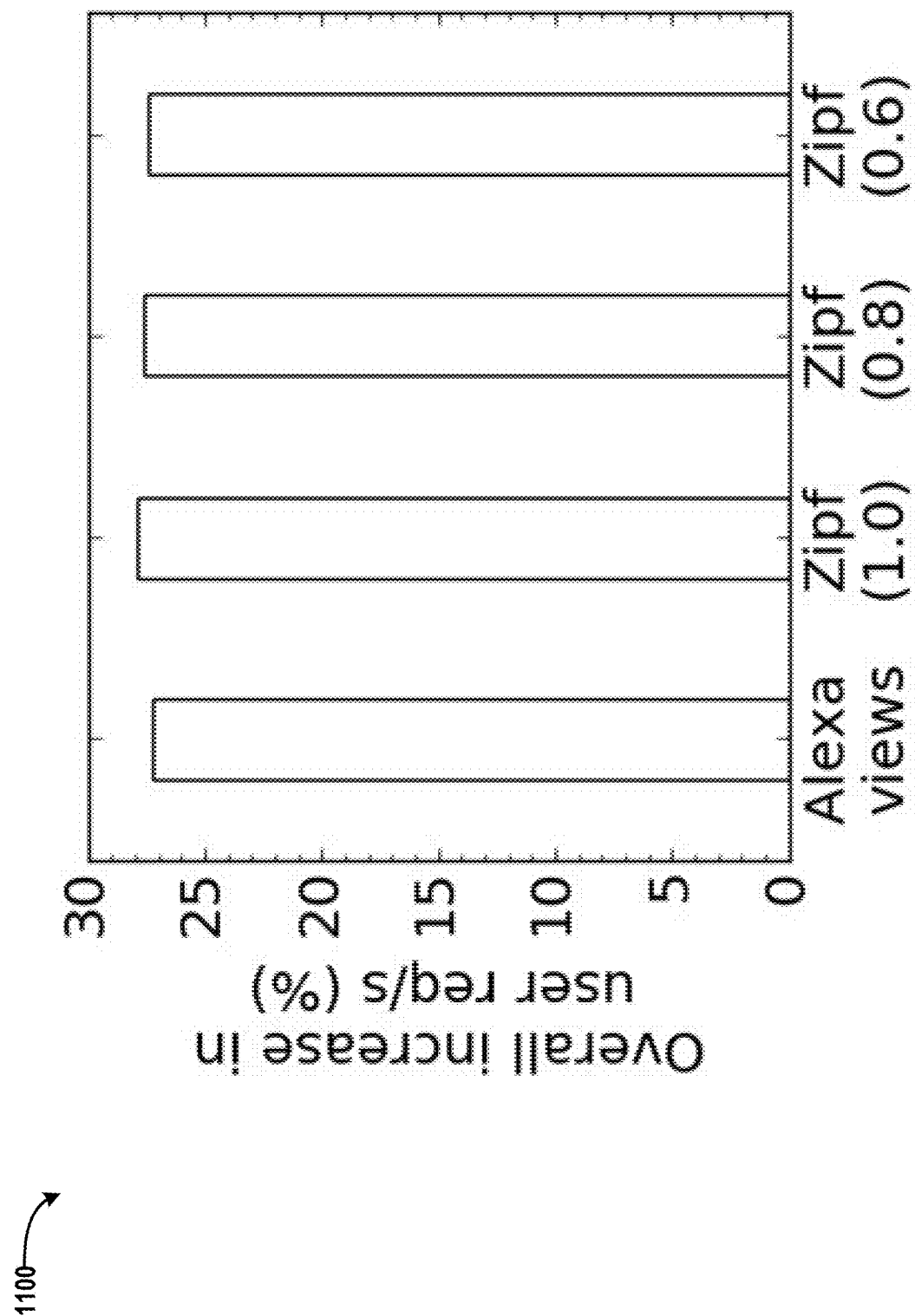
FIG. 11 is a bar chart illustrating the overall increase in user requests per second with whittling across page popularity models, according to example experimental results.

Turning now to FIG. 11, a bar chart 1100 illustrating the overall increase in user requests per second with the whittling proxy system 312 across page popularity models will be described, according to one example. The bar chart 1100 shows two different models for web page popularity ($f_i$). The first model ("Alexa views" in FIG. 11) uses statistics on the number of requests to each web page estimated monthly from Alexa traffic data. The second model ("Zipf($\alpha$)" in FIG. 11) uses a Zipf distribution based on the Alexa rank of the web page as suggested by studies on web page popularity, where the number of accesses to a page of rank i is $1/i^\alpha$. The sensitivity to different values of the exponent $\alpha$ is also shown, and in summary, a larger $\alpha$ increases the fraction of requests to the most popular page. FIG. 11 shows that across all models, the whittling proxy system 312 achieves fairly consistent average improvement ranging from 27.2% to 27.89%.

To further understand the aforementioned benefits of the whittling proxy system 312, is a bar chart illustrating the increase in user requests per second with whittling for each web page in a sample set of web pages, according to one example.

Figure 12:
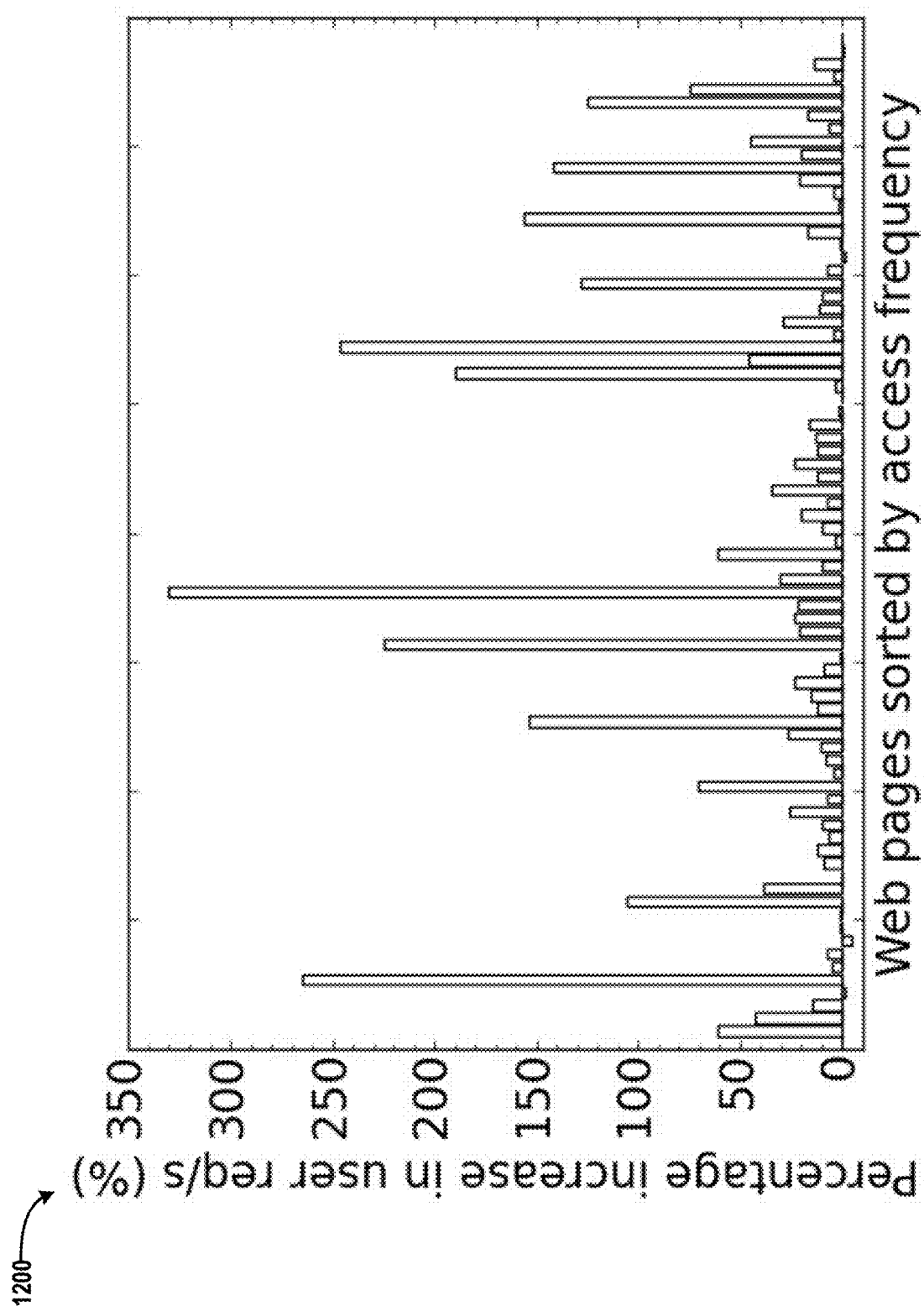
FIG. 12 is a bar chart illustrating the increase in user requests per second with whittling for each web page in a sample set of web pages sorted by access frequency, according to example experimental results.

In particular, FIG. 12 a bar chart 1200 shows the increase in user requests per second achieved by the whittling proxy system 312 over full Javascript execution (Y-axis) for individual pages (X-axis), sorted by the access frequency of the page. While the whittling proxy system 312 provides benefits for most pages (with a 12% improvement for the median page), the benefits exceed 34% for 25% of the pages, and is as high as 100-300% for a few pages.

The benefits with the whittling proxy system 312 are most pronounced for pages with (i) significant Javascript computation, and (ii) where whittling can achieve significant reduction in such computation. For example, for www.facebook.com, the Javascript compute is significant, and whittling reduces Javascript computation by a factor of 2, which translates to an increase in user requests per second by a factor of 1.43 compared to FullRedEx. The whittling proxy system 312 achieves these benefits while still pushing all objects in the signature.

Figure 13:
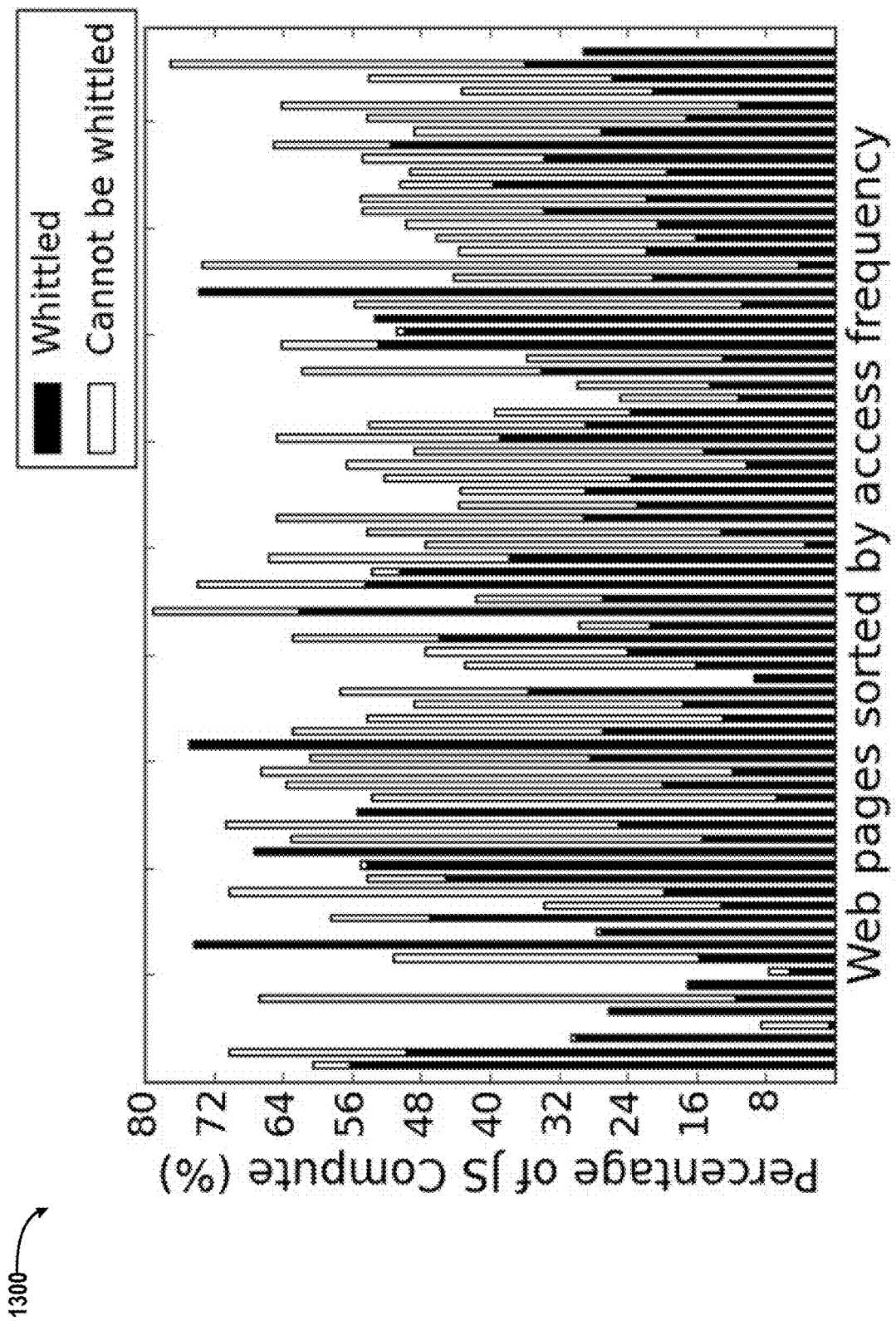
FIG. 13 is a bar chart illustrating the percentage of Javascript compute contributed by all functions tested by the proxy system, split as a fraction that can and cannot be whittled, according to example experimental results.

Turning now to FIG. 13, a bar chart 1300 illustrating the percentage of Javascript compute contributed by all functions tested by the whittling proxy system 312, split as a fraction that can and cannot be whittled, according to one example. FIG. 13 shows the percentage of Javascript computation (Y-axis) that can be whittled for each page. Each bar corresponds to a page (sorted by page frequency). The lower dark and upper unshaded portions correspond, respectively, to the fraction of Javascript compute that can and cannot be whittled based on whether the associated functions were necessary for object fetches. Note that the numbers do not add up to 100%—the remainder corresponds to functions that were not tested by the whittling proxy system 312 for reasons described below. For the left most page, the lower and upper portions are 56% and 4% respectively. The whittling proxy system 312 saves more than 25% of the overall Javascript computation for half the pages and as much as 50-75% for 15% of the pages (thereby incurring 2×-4× lower Javascript computation times).

While the benefits are already substantial, these reported savings are conservative because these reported savings are based upon only functions available for testing. There are two factors that limit tested functions: (i) only heaviest functions that account for 80% of compute and at most 200 functions are tested for any page; and (ii) mismatches between the browsers used for the profiling and whittling steps implied functions identified by the profiler could not be tested for whittling. The first factor was relatively minor—for 85% of the pages, functions accounting for 80% of compute could be tested, while for all pages, functions accounting for at least 62% of compute could be tested. The second factor, while more significant, is not fundamental to the approach used by the whittling proxy system 312, and can be handled in the future through improved profiler support. Despite this factor, the whittling proxy system 312 is still able to achieve significant savings already. For half the pages, the whittling proxy system 312 can whittle over 50% of compute corresponding to the tested functions. Moreover, the overall increase in user requests per second by the whittling proxy system 312 goes up to 40% if only pages where functions corresponding to at most 20% of Javascript compute cannot be tested due to the second factor.

The experiments described herein also considered Javascript computation that cannot be whittled, and investigated the extent to which dependencies required the function to be retained, though individual function testing indicated the function could be whittled. Overall, the savings lost due to function dependencies is not significant—that is, the whittling proxy system 312 loses Javascript computation savings of under 10% for 90% of the pages and at most 25% across all pages. Overall the results of the experiments indicate that whittling is effective in eliminating a significant fraction of the Javascript computation at the proxy without impacting objects fetched.

The impact of the whittling proxy system 312 on client latency will now be described in comparison to the client latency of FullRedEx as well as other schemes (e.g., Baseline, SPDY, and Push_HTMLEmbed). To minimize the impact of LTE network variability, multiple rounds of experiments were performed, with each round involving running latency experiments with all the schemes back-to-back. For each scheme, the results are summarized by the median OLT and Speed Index metrics across the runs.

Figure 14:
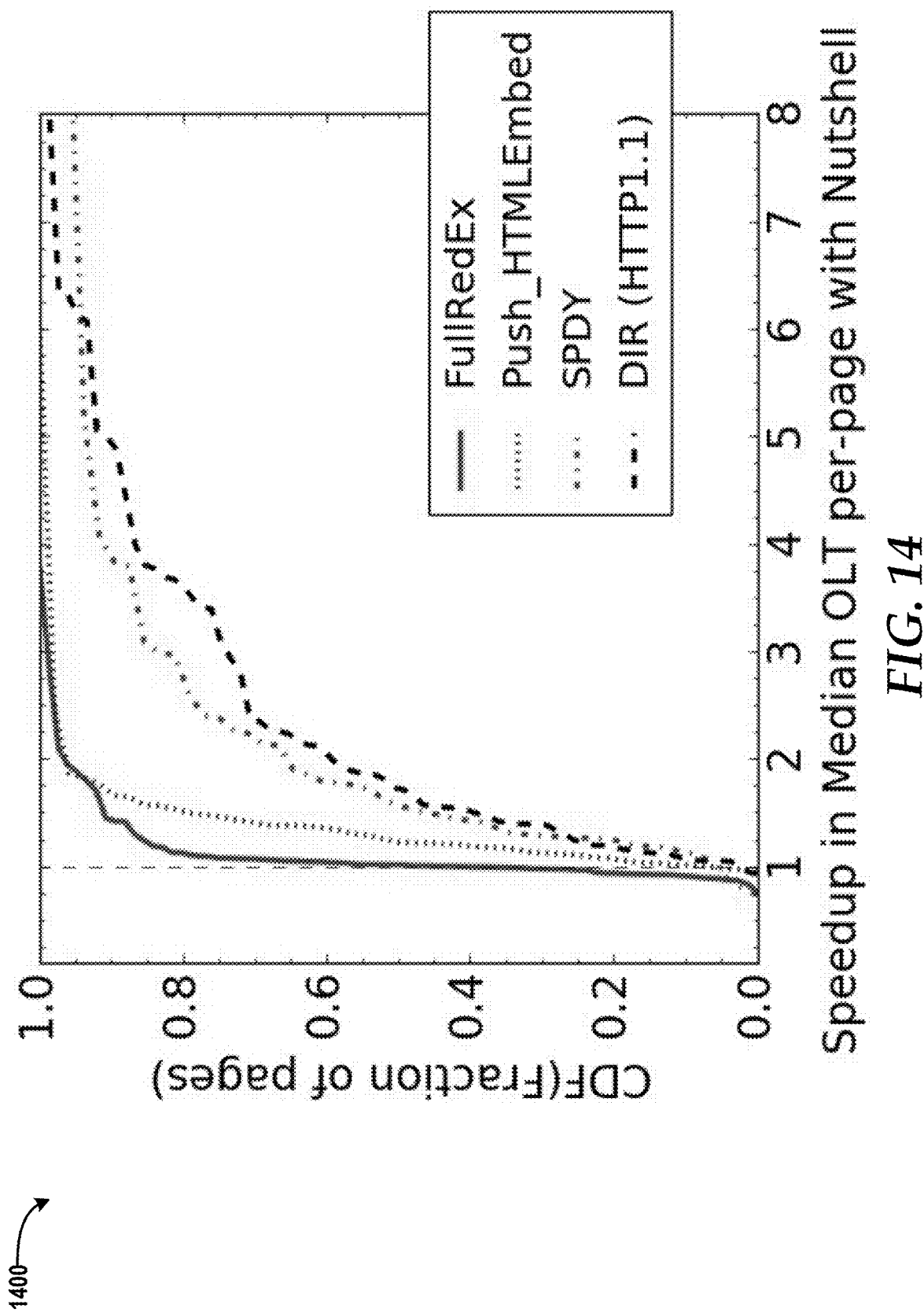
FIG. 14 is a line chart illustrating the speedup in median client OLT with whittling compared to other schemes, according to example experimental results.
Figure 15:
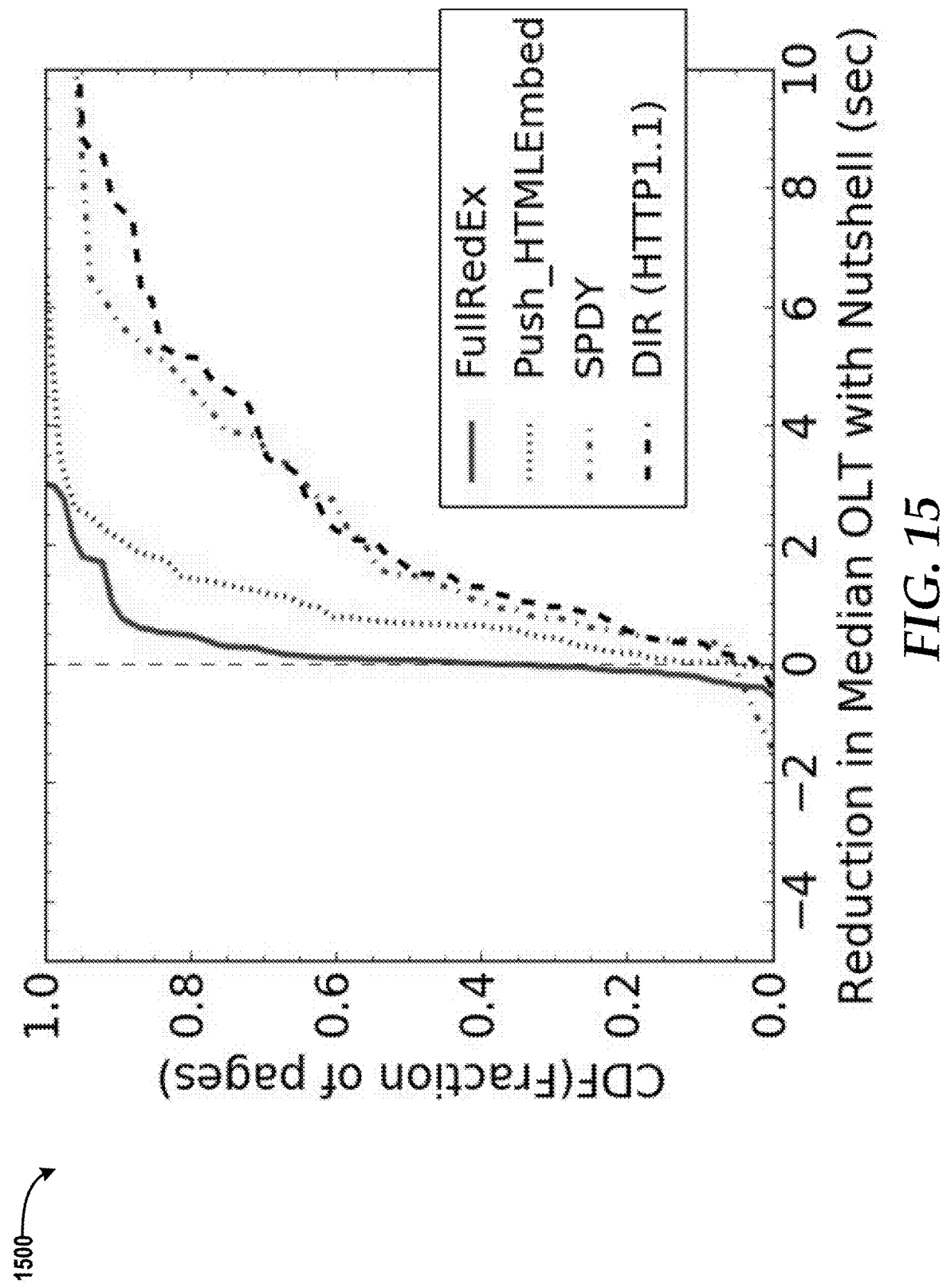
FIG. 15 is a line chart illustrating the reduction in median client OLT with whittling compared to other schemes, according to example experimental results.

FIG. 14 is a line chart 1400 illustrating the speedup in median client OLT with whittling compared to other schemes, according to one example. In particular, FIG. 14 shows the speedup provided by the whittling proxy system 312 over each of these schemes (i.e., the ratio of median OLT with a scheme to median OLT with the whittling proxy system 312). FIG. 15 is a line chart 1500 showing the absolute reduction in median OLT with the whittling proxy system 312.

As shown in FIGS. 14 and 15, the whittling proxy system 312 provides a speedup of 1.7 over Baseline and a speedup of more than 1.5 over SPDY for half the pages, and latency reductions of more than 2 seconds for 45% of the pages compared to both schemes. Further analysis shows the benefits over SPDY are more pronounced for pages with deeper dependency graphs, while the benefits are more limited for pages with more shallow dependency graphs. This is because, with SPDY, the task of identifying object dependencies remains with the client.

As also shown in FIGS. 14 and 15, the whittling proxy system 312 provides a speedup of 1.24 over Push_HTMLEmbed for the median page, but the speedups exceed 1.5 for more than 15% of the pages. In absolute terms, this translates to latency reductions of over 1 second for 25% of the pages, with some pages seeing reductions of 6 seconds. These benefits can be attributed to the whittling proxy system 312 pushing all objects as opposed to a subset thereof.

While the whittling proxy system 312 and FullRedEx perform comparably for the majority of pages, the whittling proxy system 312 achieves speedups higher than 1.2 for 15% of the pages, and absolute latency reductions of over 1 second for 10% of the pages. The differences arise because the whittling proxy system 312 lowers the OLT at the proxy due to less Javascript computation being needed, which, in turn, results in objects being pushed to the client earlier. The whittling proxy system 312 performs slightly worse for 34% of the pages, but only 10% of the pages see median OLT higher by 200 ms, and no page sees median OLT higher than 515 ms. Likewise, the whittling proxy system 312 achieves latency benefits of under 500 ms for 45% of the pages. These minor performance differences can be attributed to LTE network variability.

Figure 16:
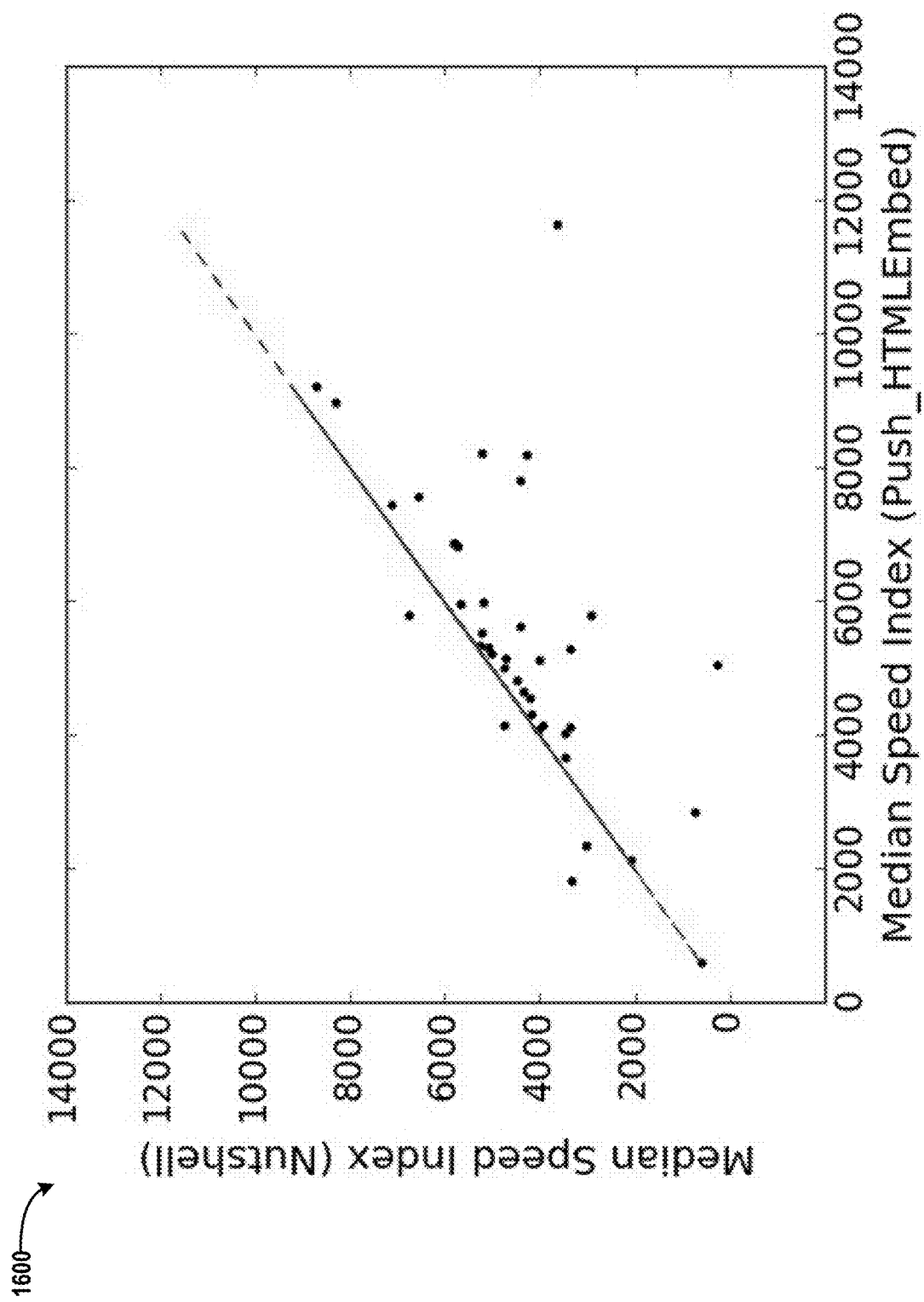
FIG. 16 is a scatter plot chart illustrating the median speed index with Push_HTMLEmbed and whittling, according to example experimental results.

While the results presented above are based upon the OLT metric, these trends are generally consistent with the Speed Index metric. For example, FIG. 16 shows a scatter plot 1600, with each point corresponding to a page, and the X-Axis and Y-Axis representing the median Speed Index across the runs with Push_HTMLEmbed and the whittling proxy system 312, respectively. A majority of points lie below the y=x line, which indicates that the whittling proxy system 312 achieves a smaller Speed Index (lower values represent better performance), and a faster visual page load from a user perspective.

Likewise, comparing the whittling proxy system 312 and FullRedEx, the Speed Index metric results are generally consistent with OLT (not shown). The whittling proxy system 312 achieves a lower Speed Index for 65% of the pages, while the Speed Index is smaller with FullRedEx for 35% of the pages, with the differences relatively small. Further, for most pages where the whittling proxy system 312 achieves significantly lower OLT than FullRedEx, the Speed Index is lower as well. An exception is www.reddit-.com, where the whittling proxy system 312 achieves lower OLT but a higher Speed Index. Further analysis shows that www.reddit.com, contains images that are shown above-the-fold, yet fetched after onLoad. Since the whittling proxy system 312 implementation derives a signature based upon objects needed for a page load event, the whittling proxy system 312 whittles away a function responsible to fetch one of the images. Consequently, this object is not pushed by the whittling proxy system 312, and must be fetched directly by the client from the server. This issue is not inherent to whittling itself—for instance, if a signature were based on above-the-fold content, then, the whittling proxy system 312 would retain the necessary code, and ensure all necessary objects are pushed. Interestingly, for a few pages, notably www.ups.com, the same phenomenon led the whittling proxy system 312 to whittle code that fetched an asynchronous Javascript object and not push that object. In this case, the whittling proxy system 312 performed better in both OLT and Speed Index by avoiding compute delays associated with the Javascript, since the object did not impact above-the-fold content.

Overall, the aforementioned results show that beyond the primary benefit of achieving higher throughput compared to FullRedEx, the whittling proxy system 312 can not only match the latency benefits but can provide substantial latency improvements for some pages.

The re-use of whittling across multiple users will now be described. As described above, the whittling proxy system 312 can reuse whittling across page loads. The whittling proxy system 312 also can reuse whittling across users by analyzing common Javascript content among users. To this end, a user study with 14 landing pages from the Alexa top 100 pages is described below. Each of these pages were downloaded simultaneously by 8 real users with diverse browsing profile, browser version, OS, and location. Choosing one user as a baseline, the Javascript files of all other users can be compared to this baseline. The Javascript files can be categorized as follows: (i) files that have MD5 hashes that match the MD5 hash of a Javascript file of the baseline user; (ii) files that share the same file name as the baseline user, but with a different MD5 hash; and (iii) files for which neither the MD5 hash nor file name match any Javascript file for the baseline user. As discussed above, the whittling proxy system 312 can obtain full benefits with whittling for class (i) files, and a significant fraction of the benefits for class (ii) files. The analysis can be repeated choosing different users as the baseline resulting in 56 user session data points for each of the 14 pages.

Figure 17:
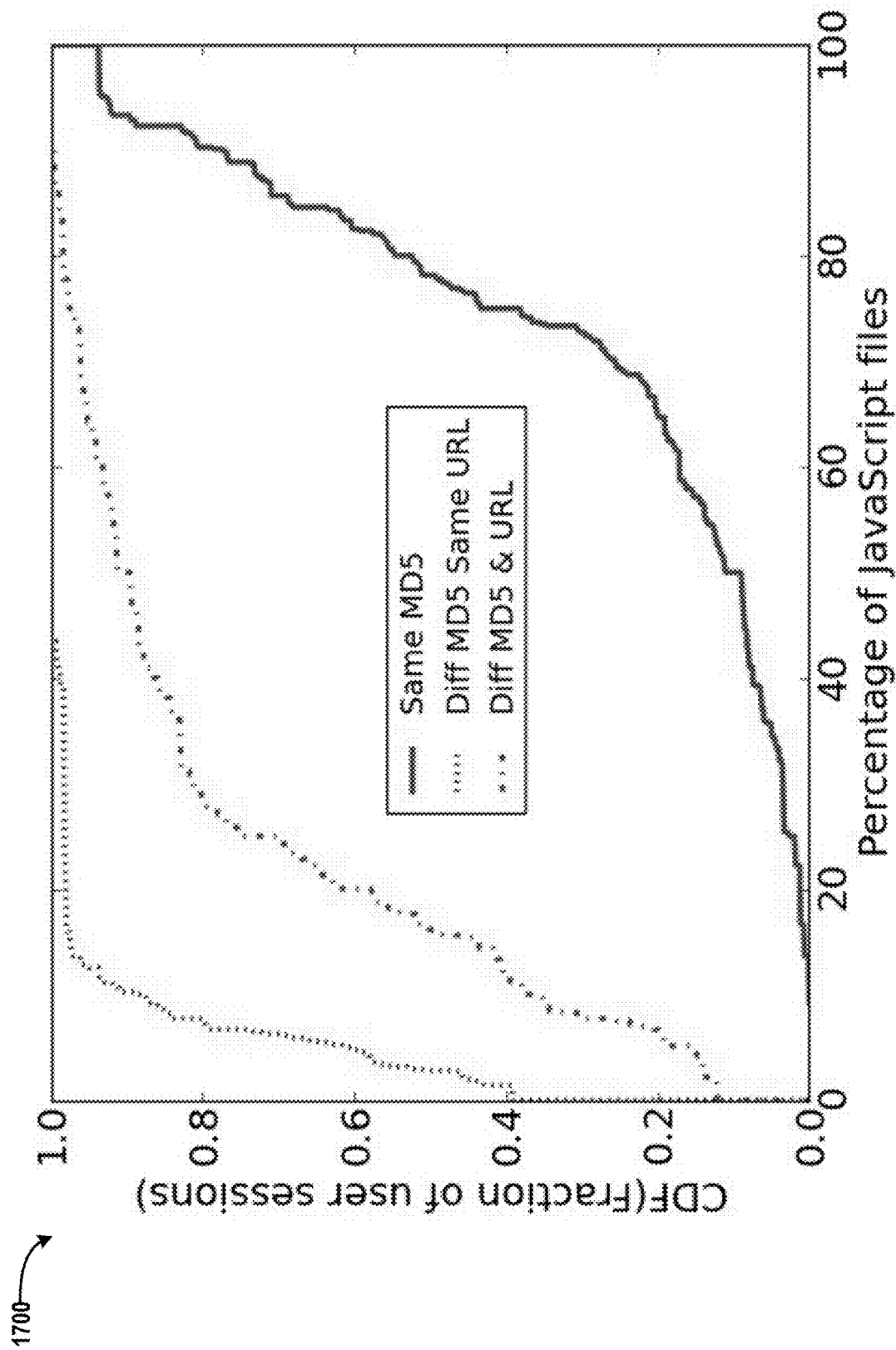
FIG. 17 is a line chart illustrating Javascript code overlap across users, according to example experimental results.

FIG. 17 is a line chart 1700 showing Javascript code overlap across users. In particular, FIG. 17 shows a cumulative distribution function ("CDF") of the % of Javascript that falls under the 3 classes across all users' sessions and all pages. More than 80% of Javascript files have the same content across users (right-most curve) for half of the user sessions allowing full reuse of whittling. Further, the middle curve shows that for half of the user sessions, less than 18% of Javascript files belong to class (iii), where whittling cannot be reused. Overall, these results indicate significant common Javascript code across users and the potential for significant reuse of whittling across users.

With any redundant execution approach, including the whittling proxy system 312, there might be differences in the URLs requested by the proxy and the client (a) if the proxy does not emulate the client faithfully, or (b) if the web page uses functions like Math.random( ) in Javascript to generate a different URL in each run. In particular, the proxy might push objects whose URLs are not requested by the client, thereby resulting in wasted bandwidth. The wasted data ("WD") can be measured as the percentage of bytes pushed by the proxy that are unused by the client. The average WD across all pages is weighted by the popularity of the pages. The weighted average WD is 18.4% with FullRedEx, and 18.3% with the whittling proxy system 312 for the "Alexa views" model, with similar results for other models. A key factor impacting the results is that PhantomJavascript currently does not support several HTML5 features (e.g., srcset attribute). This results in the proxy sometimes requesting different URLs than the mobile client even though the mobile user environment was emulated. WD would be lower as support for these features is implemented in PhantomJavascript, or with an alternate browser choice for the proxy implementation. To confirm this, the above measurements were repeated using a desktop PhantomJavascript client, and the results show that the weighted average WD is modest with both FullRedEx and the whittling proxy system 312 (8% and 7%), respectively. The whittling proxy system 312 sees slightly lower WD than FullRedEx because the proxy only executes the code required to fetch the signature, which sometimes excludes URLs that vary in back-to-back run.

Figure 18:
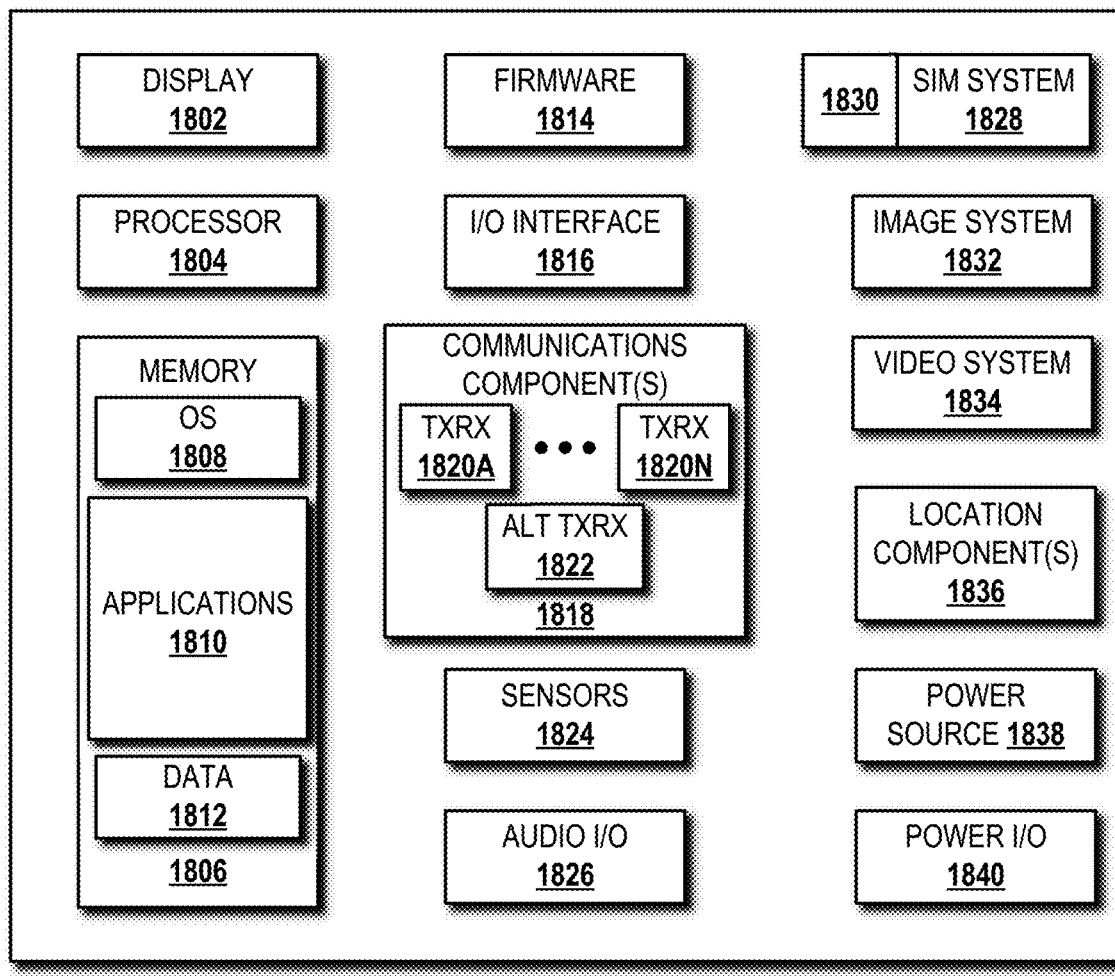
FIG. 18 is a block diagram illustrating an example mobile device capable of implementing aspects of the embodiments disclosed herein.

Turning now to FIG. 18, an illustrative mobile device 1800 and components thereof will be described. In some embodiments, one or more of the client devices 302 is/are configured the same as or similar to the mobile device 1800. While connections are not shown between the various components illustrated in FIG. 18, it should be understood that some, none, or all of the components illustrated in FIG. 18 can be configured to interact with one other to carry out various device functions. In some embodiments, the components are arranged so as to communicate via one or more busses (not shown). Thus, it should be understood that FIG. 18 and the following description are intended to provide a general understanding of a suitable environment in which various aspects of embodiments can be implemented, and should not be construed as being limiting in any way.

As illustrated in FIG. 18, the mobile device 1800 can include a display 1802 for displaying data. According to various embodiments, the display 1802 can be configured to display various GUI elements, text, images, video, virtual keypads and/or keyboards, messaging data, notification messages, metadata, internet content, device status, time, date, calendar data, device preferences, map and location data, combinations thereof, and/or the like. The mobile device 1800 also can include a processor 1804 and a memory or other data storage device ("memory") 1806. The processor 1804 can be configured to process data and/or can execute computer-executable instructions stored in the memory 1806. The computer-executable instructions executed by the processor 1804 can include, for example, an operating system 1808, one or more applications 1810, other computer-executable instructions stored in a memory 1806, or the like. In some embodiments, the applications 1810 also can include a user interface ("UI") application (not illustrated in FIG. 18).

The UI application can interface with the operating system 1808 to facilitate user interaction with functionality and/or data stored at the mobile device 1800 and/or stored elsewhere. In some embodiments, the operating system 1808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1804 to aid a user in dialing telephone numbers, entering content, viewing account information, answering/initiating calls, entering/deleting data, entering and setting user IDs and passwords for device access, configuring settings, manipulating address book content and/or settings, multimode interaction, interacting with other applications 1810, and otherwise facilitating user interaction with the operating system 1808, the applications 1810, and/or other types or instances of data 1812 that can be stored at the mobile device 1800. According to various embodiments, the data 1812 can include, for example, telephone dialer applications, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1810, the data 1812, and/or portions thereof can be stored in the memory 1806 and/or in a firmware 1814, and can be executed by the processor 1804. The firmware 1814 also can store code for execution during device power up and power down operations. It can be appreciated that the firmware 1814 can be stored in a volatile or non-volatile data storage device including, but not limited to, the memory 1806 and/or a portion thereof.

The mobile device 1800 also can include an input/output ("I/O") interface 1816. The I/O interface 1816 can be configured to support the input/output of data such as location information, user information, organization information, presence status information, user IDs, passwords, and application initiation (start-up) requests. In some embodiments, the I/O interface 1816 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 1800 can be configured to synchronize with another device to transfer content to and/or from the mobile device 1800. In some embodiments, the mobile device 1800 can be configured to receive updates to one or more of the applications 1810 via the I/O interface 1816, though this is not necessarily the case. In some embodiments, the I/O interface 1816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1816 may be used for communications between the mobile device 1800 and a network device or local device.

The mobile device 1800 also can include a communications component 1818. The communications component 1818 can be configured to interface with the processor 1804 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 1818 includes a multimode communications subsystem for facilitating communications via the cellular network and one or more other networks.

The communications component 1818, in some embodiments, includes one or more transceivers. The one or more transceivers, if included, can be configured to communicate over the same and/or different wireless technology standards with respect to one another. For example, in some embodiments one or more of the transceivers of the communications component 1818 may be configured to communicate using GSM, CDMA ONE, CDMA2000, LTE, and various other 2G, 2.5G, 3G, 4G, 5G, and greater generation technology standards. Moreover, the communications component 1818 may facilitate communications over various channel access methods (which may or may not be used by the aforementioned standards) including, but not limited to, TDMA, FDMA, W-CDMA, OFDM, SDMA, and the like.

In addition, the communications component 1818 may facilitate data communications using GPRS, EDGE, HSPA protocol family including HSDPA, EUL or otherwise termed HSUPA, HSPA+, and various other current and future wireless data access standards. In the illustrated embodiment, the communications component 1818 can include a first transceiver ("TxRx") 1820A that can operate in a first communications mode (e.g., GSM). The communications component 1818 also can include an $N^{th}$ transceiver ("TxRx") 1820N that can operate in a second communications mode relative to the first transceiver 1820A (e.g., UMTS). While two transceivers 1820A-1820N (hereinafter collectively and/or generically referred to as "transceivers 1820") are shown in FIG. 18, it should be appreciated that less than two, two, and/or more than two transceivers 1820 can be included in the communications component 1818.

The communications component 1818 also can include an alternative transceiver ("Alt TxRx") 1822 for supporting other types and/or standards of communications. According to various contemplated embodiments, the alternative transceiver 1822 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 1818 also can facilitate reception from terrestrial radio networks, digital satellite radio networks, internet-based radio service networks, combinations thereof, and the like. The communications component 1818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1800 also can include one or more sensors 1824. The sensors 1824 can include temperature sensors, light sensors, air quality sensors, movement sensors, orientation sensors, noise sensors, proximity sensors, or the like. As such, it should be understood that the sensors 1824 can include, but are not limited to, accelerometers, magnetometers, gyroscopes, infrared sensors, noise sensors, microphones, combinations thereof, or the like. Additionally, audio capabilities for the mobile device 1800 may be provided by an audio I/O component 1826. The audio I/O component 1826 of the mobile device 1800 can include one or more speakers for the output of audio signals, one or more microphones for the collection and/or input of audio signals, and/or other audio input and/or output devices.

The illustrated mobile device 1800 also can include a subscriber identity module ("SIM") system 1828. The SIM system 1828 can include a universal SIM ("USIM"), a universal integrated circuit card ("UICC") and/or other identity devices. The SIM system 1828 can include and/or can be connected to or inserted into an interface such as a slot interface 1830. In some embodiments, the slot interface 1830 can be configured to accept insertion of other identity cards or modules for accessing various types of networks. Additionally, or alternatively, the slot interface 1830 can be configured to accept multiple subscriber identity cards. Because other devices and/or modules for identifying users and/or the mobile device 1800 are contemplated, it should be understood that these embodiments are illustrative, and should not be construed as being limiting in any way.

The mobile device 1800 also can include an image capture and processing system 1832 ("image system"). The image system 1832 can be configured to capture or otherwise obtain photos, videos, and/or other visual information. As such, the image system 1832 can include cameras, lenses, charge-coupled devices ("CCDs"), combinations thereof, or the like. The mobile device 1800 may also include a video system 1834. The video system 1834 can be configured to capture, process, record, modify, and/or store video content. Photos and videos obtained using the image system 1832 and the video system 1834, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 1800 also can include one or more location components 1836. The location components 1836 can be configured to send and/or receive signals to determine a geographic location of the mobile device 1800. According to various embodiments, the location components 1836 can send and/or receive signals from GPS devices, assisted GPS ("A-GPS") devices, WI-FI/WIMAX and/or cellular network triangulation data, combinations thereof, and the like. The location component 1836 also can be configured to communicate with the communications component 1818 to retrieve triangulation data for determining a location of the mobile device 1800. In some embodiments, the location component 1836 can interface with cellular network nodes, telephone lines, satellites, location transmitters and/or beacons, wireless network transmitters and receivers, combinations thereof, and the like. In some embodiments, the location component 1836 can include and/or can communicate with one or more of the sensors 1824 such as a compass, an accelerometer, and/or a gyroscope to determine the orientation of the mobile device 1800. Using the location component 1836, the mobile device 1800 can generate and/or receive data to identify its geographic location, or to transmit data used by other devices to determine the location of the mobile device 1800. The location component 1836 may include multiple components for determining the location and/or orientation of the mobile device 1800.

The illustrated mobile device 1800 also can include a power source 1838. The power source 1838 can include one or more batteries, power supplies, power cells, and/or other power subsystems including alternating current ("AC") and/or direct current ("DC") power devices. The power source 1838 also can interface with an external power system or charging equipment via a power I/O component 1840. Because the mobile device 1800 can include additional and/or alternative components, the above embodiment should be understood as being illustrative of one possible operating environment for various embodiments of the concepts and technologies described herein. The described embodiment of the mobile device 1800 is illustrative, and should not be construed as being limiting in any way.

Figure 19:
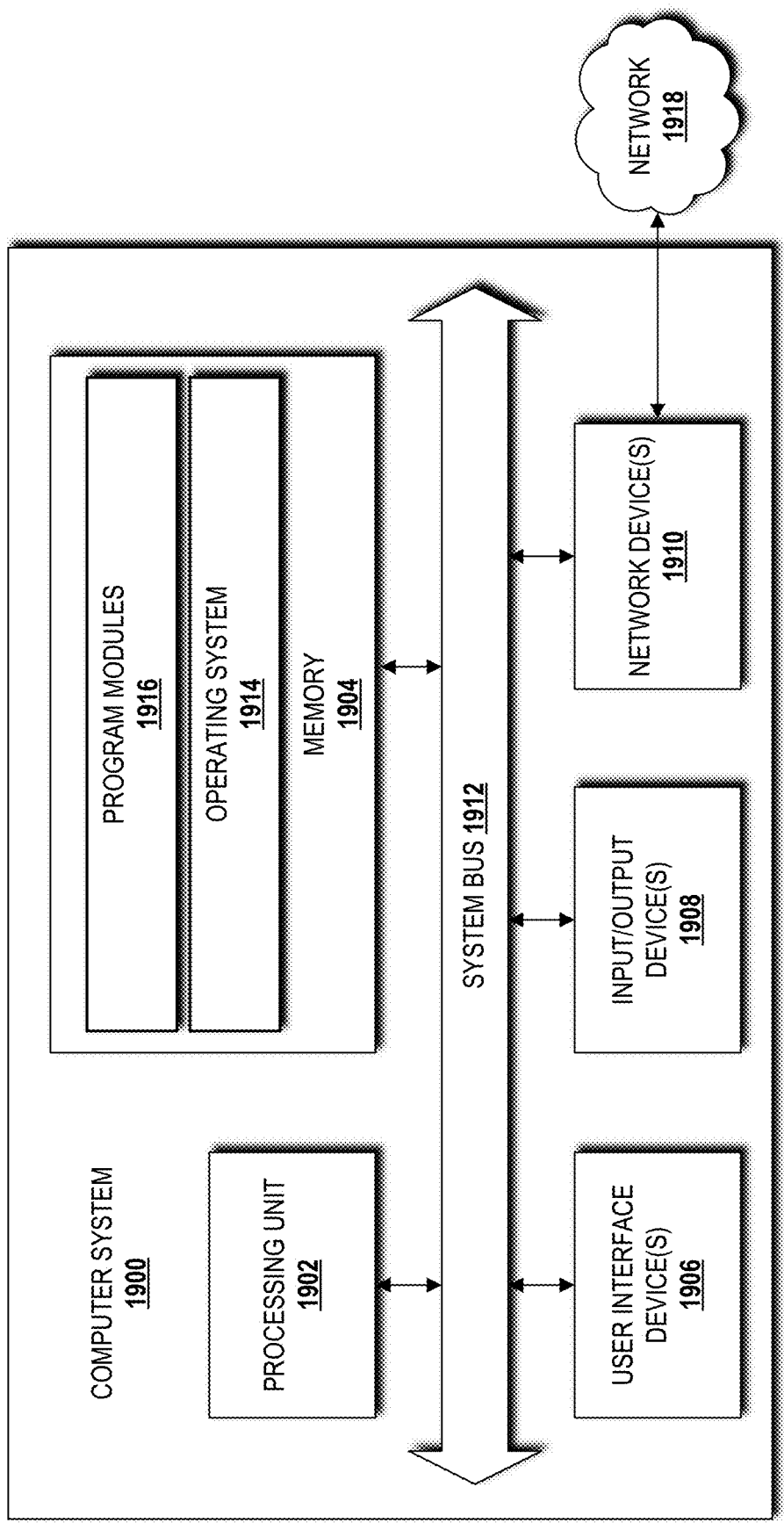
FIG. 19 is a block diagram illustrating an example computer system capable of implementing aspects of the embodiments presented herein.

FIG. 19 is a block diagram illustrating a computer system 1900 configured to provide the functionality in accordance with various embodiments of the concepts and technologies disclosed herein. In some embodiments, the whittling proxy system 312 can be configured, at least in part, like the architecture of the computer system 1900. It should be understood, however, that modification to the architecture may be made to facilitate certain interactions among elements described herein.

The computer system 1900 includes a processing unit 1902, a memory 1904, one or more user interface devices 1906, one or more input/output ("I/O") devices 1908, and one or more network devices 1910, each of which is operatively connected to a system bus 1912. The bus 1912 enables bi-directional communication between the processing unit 1902, the memory 1904, the user interface devices 1906, the I/O devices 1908, and the network devices 1910.

The processing unit 1902 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1904 communicates with the processing unit 1902 via the system bus 1912. In some embodiments, the memory 1904 is operatively connected to a memory controller (not shown) that enables communication with the processing unit 1902 via the system bus 1912. The illustrated memory 1904 includes an operating system 1914 and one or more program modules 1916. The operating system 1914 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1916 may include various software and/or program modules to perform the various operations described herein. The program modules 1916 and/or other programs can be embodied in computer-readable media containing instructions that, when executed by the processing unit 1902, perform various operations such as those described herein. According to embodiments, the program modules 1916 may be embodied in hardware, software, firmware, or any combination thereof.

By way of example, and not limitation, computer-readable media may include any available computer storage media or communication media that can be accessed by the computer system 1900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1900. In the claims, the phrase "computer storage medium" and variations thereof does not include waves or signals per se and/or communication media.

The user interface devices 1906 may include one or more devices with which a user accesses the computer system 1900. The user interface devices 1906 may include, but are not limited to, computers, servers, PDAs, cellular phones, or any suitable computing devices. The I/O devices 1908 enable a user to interface with the program modules 1916. In one embodiment, the I/O devices 1908 are operatively connected to an I/O controller (not shown) that enables communication with the processing unit 1902 via the system bus 1912. The I/O devices 1908 may include one or more input devices, such as, but not limited to, a keyboard, a mouse, or an electronic stylus. Further, the I/O devices 1908 may include one or more output devices, such as, but not limited to, a display screen or a printer. In some embodiments, the I/O devices 1908 can be used for manual controls for operations to exercise under certain emergency situations.

The network devices 1910 enable the computer system 1900 to communicate with other networks or remote systems via a network 1918. Examples of the network devices 1910 include, but are not limited to, a modem, a radio frequency ("RF") or infrared ("IR") transceiver, a telephonic interface, a bridge, a router, or a network card. The network 1918 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1914 may be a wired network such as, but not limited to, a Wide Area Network ("WAN"), a wired Personal Area Network ("PAN"), or a wired Metropolitan Area Network ("MAN"). The network 1918 may be any other network described herein.

Figure 20:
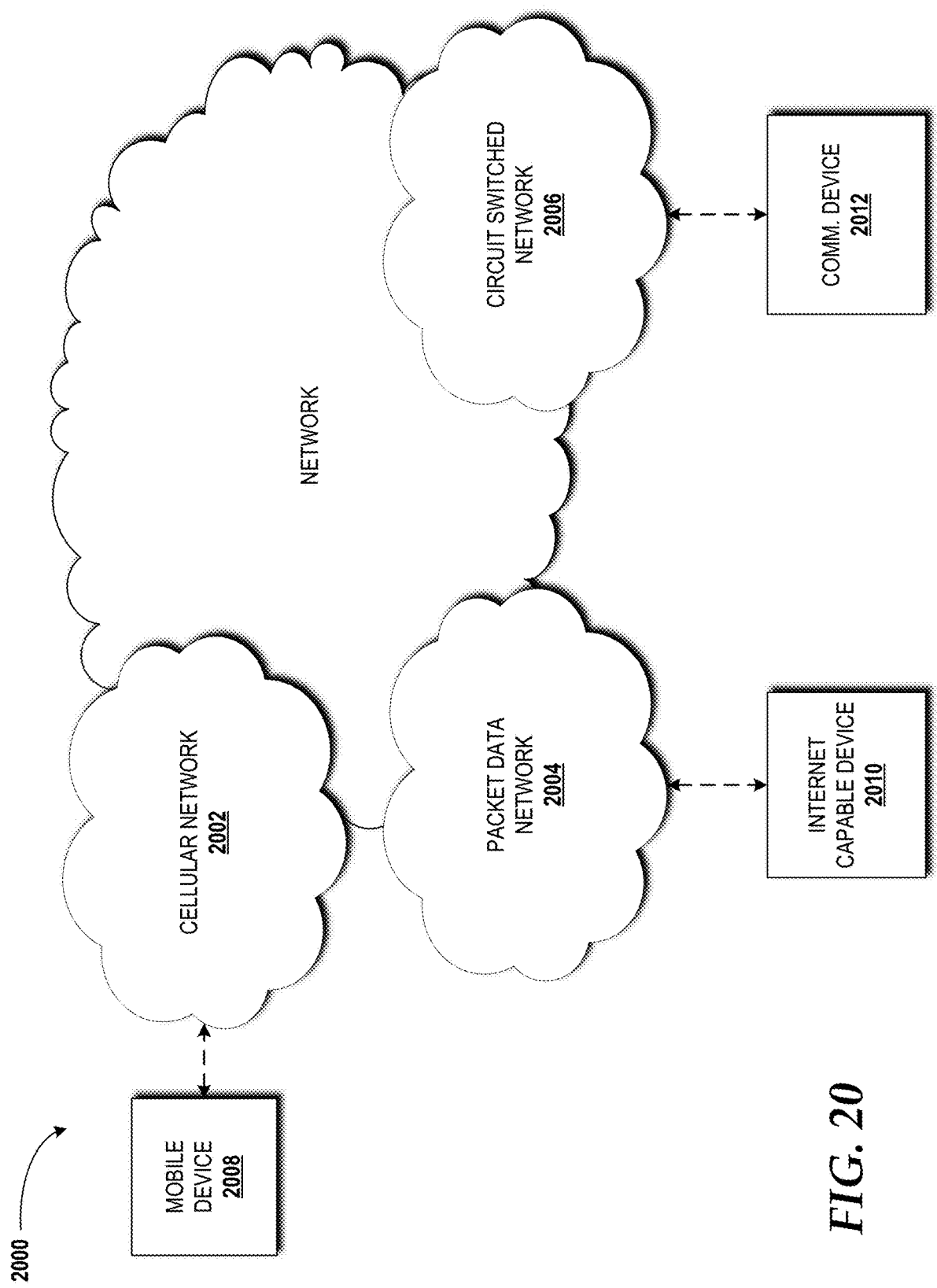
FIG. 20 is a diagram illustrating a network, according to an illustrative embodiment.

Turning now to FIG. 20, details of a network 2000 are illustrated, according to an illustrative embodiment. The network 2000 includes a cellular network 2002 (e.g., the cellular network 304 shown in FIG. 3), a packet data network 2004, for example, the Internet 310, and a circuit switched network 2006, for example, a PSTN. The cellular network 2002 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 2002 also includes radios and nodes for receiving and transmitting voice, data, and combinations thereof to and from radio transceivers, networks, the packet data network 2004, and the circuit switched network 2006.

A mobile communications device 2008, such as, for example, the client device(s) 302, a cellular telephone, a user equipment, a mobile terminal, a PDA, a laptop computer, a handheld computer, and combinations thereof, can be operatively connected to the cellular network 2002. The cellular network 2002 can be configured as a 2G GSM network and can provide data communications via GPRS and/or EDGE. Additionally, or alternatively, the cellular network 2002 can be configured as a 3G UMTS network and can provide data communications via the HSPA protocol family, for example, HSDPA, EUL (also referred to as HSUPA), and HSPA+. The cellular network 2002 also is compatible with 4G mobile communications standards such as LTE, or the like, as well as evolved and future mobile standards.

The packet data network 2004 includes various devices, for example, servers, computers, databases, and other devices in communication with one another, as is generally known. The packet data network 2004 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 2004 includes or is in communication with the Internet 310. The circuit switched network 2006 includes various hardware and software for providing circuit switched communications. The circuit switched network 2006 may include, or may be, what is often referred to as a POTS. The functionality of a circuit switched network 2006 or other circuit-switched network are generally known and will not be described herein in detail.

The illustrated cellular network 2002 is shown in communication with the packet data network 2004 and a circuit switched network 2006, though it should be appreciated that this is not necessarily the case. One or more Internet-capable devices 2010, for example, the client device(s) 302, a PC, a laptop, a portable device, or another suitable device, can communicate with one or more cellular networks 2002, and devices connected thereto, through the packet data network 2004. It also should be appreciated that the Internet-capable device 2010 can communicate with the packet data network 2004 through the circuit switched network 2006, the cellular network 2002, and/or via other networks (not illustrated).

As illustrated, a communications device 2012, for example, a telephone, facsimile machine, modem, computer, or the like, can be in communication with the circuit switched network 2006, and therethrough to the packet data network 2004 and/or the cellular network 2002. It should be appreciated that the communications device 2012 can be an Internet-capable device, and can be substantially similar to the Internet-capable device 2010. In the specification, the network is used to refer broadly to any combination of the networks 2002, 2004, 2006 shown in FIG. 20.

Figure 21:
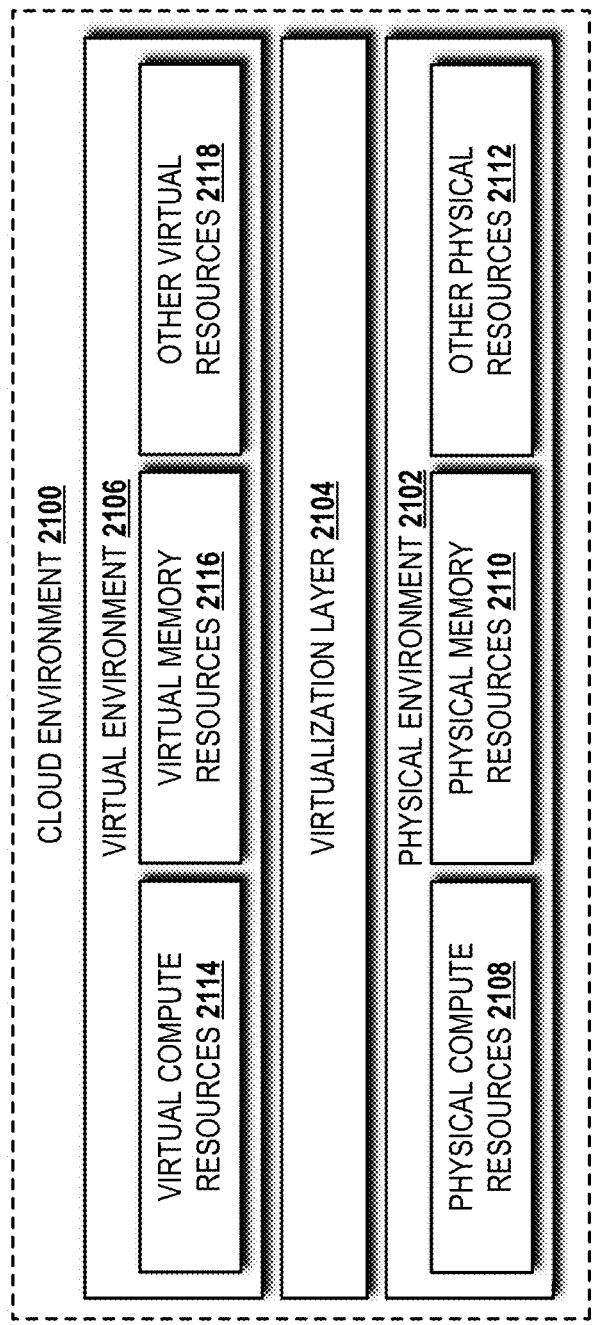
FIG. 21 is a block diagram illustrating aspects of an illustrative cloud environment capable of implementing aspects of the embodiments presented herein.

Turning now to FIG. 21, an illustrative cloud environment 2100 will be described, according to an illustrative embodiment. The cloud environment 2100 includes a physical environment 2102, a virtualization layer 2104, and a virtual environment 2106. While no connections are shown in FIG. 21, it should be understood that some, none, or all of the components illustrated in FIG. 21 can be configured to interact with one other to carry out various functions described herein. In some embodiments, the components are arranged so as to communicate via one or more networks. Thus, it should be understood that FIG. 21 and the remaining description are intended to provide a general understanding of a suitable environment in which various aspects of the embodiments described herein can be implemented, and should not be construed as being limiting in any way.

The physical environment 2102 provides hardware resources, which, in the illustrated embodiment, include one or more physical compute resources 2108, one or more physical memory resources 2110, and one or more other physical resources 2112. The physical compute resource(s) 2108 can include one or more hardware components that perform computations to process data and/or to execute computer-executable instructions of one or more application programs, one or more operating systems, and/or other software. In some embodiments, one or more components of the whittling proxy system 312 and/or other elements disclosed herein can be implemented at least in part, by the physical compute resources 2108.

The physical compute resources 2108 can include one or more central processing units ("CPUs") configured with one or more processing cores. The physical compute resources 2108 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 2108 can include one or more discrete GPUs. In some other embodiments, the physical compute resources 2108 can include CPU and GPU components that are configured in accordance with a co-processing CPU/GPU computing model, wherein the sequential part of an application executes on the CPU and the computationally-intensive part is accelerated by the GPU processing capabilities. The physical compute resources 2108 can include one or more system-on-chip ("SoC") components along with one or more other components, including, for example, one or more of the physical memory resources 2110, and/or one or more of the other physical resources 2112. In some embodiments, the physical compute resources 2108 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 2108 can be or can include one or more hardware components architected in accordance with an ARM architecture, available for license from ARM HOLDINGS of Cambridge, United Kingdom. Alternatively, the physical compute resources 2108 can be or can include one or more hardware components architected in accordance with an x86 architecture, such an architecture available from INTEL CORPORATION of Mountain View, Calif., and others. Those skilled in the art will appreciate the implementation of the physical compute resources 2108 can utilize various computation architectures, and as such, the physical compute resources 2108 should not be construed as being limited to any particular computation architecture or combination of computation architectures, including those explicitly disclosed herein.

The physical memory resource(s) 2110 can include one or more hardware components that perform storage/memory operations, including temporary or permanent storage operations. In some embodiments, the physical memory resource(s) 2110 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 2108.

The other physical resource(s) 2112 can include any other hardware resources that can be utilized by the physical compute resources(s) 2108 and/or the physical memory resource(s) 2110 to perform operations described herein. The other physical resource(s) 2112 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 2102 can be virtualized by one or more virtual machine monitors (not shown; also known as "hypervisors") operating within the virtualization/control layer 2104 to create virtual resources that reside in the virtual environment 2106. The virtual machine monitors can be or can include software, firmware, and/or hardware that alone or in combination with other software, firmware, and/or hardware, creates and manages virtual resources operating within the virtual environment 2106.

The virtual resources operating within the virtual environment 2106 can include abstractions of at least a portion of the physical compute resources 2108, the physical memory resources 2110, and/or the other physical resources 2112, or any combination thereof. In some embodiments, the abstractions can include one or more virtual machines upon which one or more applications can be executed. In some embodiments, one or more components of the whittling proxy system 312 and/or other elements disclosed herein can be implemented in the virtual environment 2106.

Existing approaches to improving web page load can be classified along two dimensions: (a) proxy based execution and (b) optimizations such as content push, prioritization (controlling the order in which objects are sent), and object compression. As shown in Table 1 below, proxy execution-based approaches alone can be classified into (i) non-redundant execution; and (ii) redundant execution. Non-redundant proxy-based execution can reduce the compute delay at the client. Some implementations eliminate all client-side execution by getting the proxy to render the page and pushing the rendered page to the client. Though these approaches can reduce initial page load times, eliminating client execution incurs latency on user interactions (e.g., mouse hover, clicks, etc.) since the Javascript processing of these interactions should be done in the cloud.

|  | No Execution | Non-Redundant | Redundant |
| --- | --- | --- | --- |
| Prioritization | ✓ | ✓ | ✓ |
| Compression | ✓ | ✓ | ✓ |
| Push | Subset | All | All |
| Reduce Client Complexity | x | ✓ | x |
| Scalability bottleneck | Low None | High Compute | Low Compute |

A more recent approach involves partial-elimination of client-side Javascript code. Here, the proxy executes Javascript in a web page to a point, and then migrates state to the client. The client continues the process from that point. Since the migrated state can become large, these approaches re-execute part (idempotent operations) of the CSS and Javascript code at the client. The migration of execution mid-flight from the proxy to the client makes partial elimination fairly complex. It is further complicated by issues such as modifications to the underlying Javascript engine, browser consistency at the proxy and client, and not supporting widely-used Javascript constructs such as eval prior to page load. A recent emulation-based study posits that mobile web latencies are compute-bound. Measurements on real LTE networks with mobile clients show that the network is a significant component of latency (see FIG. 1). Consequently, the benefit of reduced compute delay while adding network delay may be relatively small in latency-dominated cellular networks.

The benefits of server push over basic SPDY are well-known. Some prior work does a limited form of push where only static objects (invariant across users and multiple runs) are pushed, with other objects pulled by the client. Other prior works augment server push to ensure that the server does not push objects already in the client's cache. In contrast, the concepts and technologies disclosed herein solve the harder problem of identifying all the objects relevant to the client (including personalized content), and push those objects. With the whittling proxy system 312, the scaling of redundant execution proxies is improved to fully derive the advantages of push. Other prior works show the benefits of pre-loading resources of a page through speculative prefetching. The whittling proxy system 312 derives similar benefits through proxy-based push.

Several popular browsers reduce the size of data transferred by including support for data transformation and compression in the cloud. However, compression by itself does not always lower latencies. Some prior work reprioritizes content so that critical content is delivered early by using a dependency structure of objects and user preferences. Incorporating user preferences might not be easy in practice. Other prior work proposes dynamic re-prioritization of object fetches by tracking fine-grained dependencies in web pages. For best results with this work, the page has to be served from a single server. Still other prior work employs user gaze tracking to automatically identify critical content. This requires users to submit to gaze tracking, which might not be easy in practice, and it is unclear how the approach will extend to highly personalized pages where users see varying content. That said, the whittling proxy system 312 disclosed herein can be complementary to these above approaches, and all the mechanisms above may be readily combined with the whittling proxy system 312.

Beyond web pages, researchers have investigated offloading code of generic applications (e.g., compute intensive face recognition applications) to the cloud, primarily to reduce computation time and save device energy. In contrast, the concepts and technologies disclosed herein explore redundant execution for networking-intensive web download. Some prior work replicates execution at the client and the cloud, and allows either replica to lead the execution depending on which is faster during different phases of the application. Because either replica might affect user-visible content, this prior work is unable to leverage approximation or to execute only a subset of Javascript code, which are two optimizations that the whittling proxy system 312 employs. The whittling proxy system's 312 testing has similarities to A/B testing. However, while A/B testing is typically used to measure the impact of user-visible changes on user behavior, the whittling proxy system's 312 approach is an internal method to determine if a function can be whittled. As such, the end users see a single unmodified view of the web page.

The concepts and technologies disclosed herein provide a proxy design that can simultaneously (i) achieve low latency over cellular networks by pushing all objects needed for a page load through redundant execution; and (ii) scale to support more simultaneous users by reducing Javascript computation overheads at the proxy. The whittling proxy system 312 achieves the above through whittling—a novel technique to dynamically identify and execute only a portion of the Javascript code necessary to identify and push objects required for a page load. Whittling exploits the fact that approximation is acceptable at the proxy, given the client executes the full Javascript code. Experiments summarized herein analyze performance of the whittling proxy system 312 with 78 popular Alexa web sites, and reveal that the whittling proxy system 312 sustains 27% higher user requests per second on average than FullRedEx. Moreover, by combining redundant execution and whittling, the whittling proxy system 312 achieves speedups in median page load times of 1.5 compared to SPDY, and speedups of 20% compared to FullRedEx for 15% of the pages.

Based on the foregoing, it should be appreciated that concepts and technologies directed to scalable whittled proxy execution for low-latency web over cellular networks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
  receiving, by a whittling proxy system comprising a processor, a target web page comprising a plurality of functions and a plurality of objects;
  sorting, by the whittling proxy system, the plurality of functions in decreasing order of computational effort based upon an execution time of each function of the plurality of functions;

creating a sorted list of functions comprising the plurality of functions sorted in the decreasing order of computational effort;
starting a first iteration of whittling; and
during the first iteration of whittling,
   generating, by the whittling proxy system, a first full version of the target web page, wherein the first full version of the target web page comprises the plurality of functions,
   selecting, by the whittling proxy system, from the sorted list, a first target function from the plurality of functions to be tested to determine whether the first target function can be removed from the first full version of the target web page without affecting at least one of the plurality of objects when the target web page is executed, wherein the first target function is first in the sorted list of functions,
   generating, by the whittling proxy system, a first partial version of the target web page, wherein the first partial version of the target web page comprises the first full version of the target web page with the first target function removed,
   determining, by the whittling proxy system, a first signature associated with the first full version of the target web page, wherein the first signature identifies a first set of the plurality of objects that are fetched during execution of the first full version of the target web page,
   determining, by the whittling proxy system, a second signature associated with the first partial version of the target web page, wherein the second signature identifies a second set of the plurality of objects that are fetched during execution of the first partial version of the target web page,
   comparing, by the whittling proxy system, the first signature and the second signature to determine whether the first signature matches the second signature,
   determining, by the whittling proxy system, that the first signature matches the second signature, and
   in response to determining, by the whittling proxy system, that the first signature matches the second signature, determining that the first target function can be removed from the target web page without affecting at least one of the plurality of objects when the target web page is executed.

2. The method of claim 1, further comprising:
starting a second iteration of whittling; and
during the second iteration of whittling,
   generating, by the whittling proxy system, a second full version of the target web page, wherein the second full version of the target web page comprises the plurality of functions except the first target function,
   selecting, by the whittling proxy system, from the sorted list, a second target function from the plurality of functions to be tested to determine whether the second target function also can be removed from the target web page without affecting at least one of the plurality of objects when the target web page is executed, wherein the second target function is second in the sorted list of functions,
   generating, by the whittling proxy system, a second partial version of the target web page, wherein the second partial version of the target web page comprises the second full version of the target web page with the second target function removed,
   determining, by the whittling proxy system, a third signature associated with the second full version of the target web page, wherein the third signature identifies a third set of the plurality of objects that are fetched during execution of the second full version of the target web page,
   determining, by the whittling proxy system, a fourth signature associated with the second partial version of the target web page, wherein the fourth signature identifies a fourth set of the plurality of objects that are fetched during execution of the second partial version of the target web page,
   comparing, by the whittling proxy system, the third signature to the fourth signature to determine whether the third signature matches the fourth signature, and
   in response to determining that the third signature matches the fourth signature, determining that the second target function can be removed from the target web page without affecting at least one of the plurality of objects when the target web page is executed.

3. The method of claim 2, further comprising determining if the second target function is last in the sorted list of functions.

4. The method of claim 3, further comprising, in response to determining that the second target function is not last in the sorted list of functions:
starting a third iteration of whittling; and
during the third iteration of whittling,
   generating, by the whittling proxy system, a third full version of the target web page, wherein the third full version of the target web page comprises the plurality of functions except the first target function and the second target function,
   selecting, by the whittling proxy system, from the sorted list, a third target function from the plurality of functions to be tested to determine whether the third target function also can be removed from the target web page without affecting at least one of the plurality of objects when the target web page is executed, wherein the third target function is third in the sorted list of functions,
   generating, by the whittling proxy system, a third partial version of the target web page, wherein the third partial version of the target web page comprises the third full version of the target web page with the third target function removed,
   determining, by the whittling proxy system, a fifth signature associated with the third full version of the target web page, wherein the fifth signature identifies a fifth set of the plurality of objects that are fetched during execution of the third full version of the target web page,
   determining, by the whittling proxy system, a sixth signature associated with the third partial version of the target web page, wherein the sixth signature identifies a sixth set of the plurality of objects that are fetched during execution of the third partial version of the target web page, and
   comparing, by the whittling proxy system, the fifth signature to the sixth signature to determine whether the fifth signature matches the sixth signature.

5. The method of claim 4, further comprising, in response to determining that the fifth signature matches the sixth signature, determining that the third target function can be removed from the target web page without affecting at least one of the plurality of objects when the target web page is executed.

6. The method of claim 4, further comprising, in response to determining that the fifth signature does not match the sixth signature, determining that the third target function cannot be removed from the target web page without affecting at least one of the plurality of objects when the target web page is executed.

7. The method of claim 2, further comprising, in response to determining that the second target function is last in the sorted list of functions, generating a final version for the target web page, wherein the final version of the target web page comprises the plurality of functions except the first target function and the second target function.

8. A non-transitory computer-readable storage medium having computer-executable instructions stored thereon that, when executed by a processor, cause the processor to perform operations comprising:
  receiving a target web page comprising a plurality of functions and a plurality of objects;
  sorting the plurality of functions in decreasing order of computational effort based upon an execution time of each function of the plurality of functions;
  creating a sorted list of functions comprising the plurality of functions sorted in the decreasing order of computational effort;
  starting a first iteration of whittling; and
  during the first iteration of whittling,
    generating a first full version of the target web page, wherein the first full version of the target web page comprises the plurality of functions,
    selecting, from the sorted list, a first target function from the plurality of functions to be tested to determine whether the first target function can be removed from the first full version of the target web page without affecting at least one of the plurality of objects when the target web page is executed, wherein the first target function is first in the sorted list of functions,
    generating a first partial version of the target web page, wherein the first partial version of the target web page comprises the first full version of the target web page with the first target function removed,
    determining a first signature associated with the first full version of the target web page, wherein the first signature identifies a first set of the plurality of objects that are fetched during execution of the first full version of the target web page,
    determining a second signature associated with the first partial version of the target web page, wherein the second signature identifies a second set of the plurality of objects that are fetched during execution of the first partial version of the target web page,
    comparing the first signature and the second signature to determine whether the first signature matches the second signature, and
    in response to determining that the first signature matches the second signature, determining that the first target function can be removed from the target web page without affecting at least one of the plurality of objects when the target web page is executed.

9. The non-transitory computer-readable storage medium of claim 8, wherein the operations further comprises:
  starting a second iteration of whittling; and
  during the second iteration of whittling,
    generating a second full version of the target web page, wherein the second full version of the target web page comprises the plurality of functions except the first target function,
    selecting from the sorted list, a second target function from the plurality of functions to be tested to determine whether the second target function also can be removed from the target web page without affecting at least one of the plurality of objects when the target web page is executed, wherein the second target function is second in the sorted list of functions,
    generating a second partial version of the target web page, wherein the second partial version of the target web page comprises the second full version of the target web page with the second target function removed,
    determining a third signature associated with the second full version of the target web page, wherein the third signature identifies a third set of the plurality of objects that are fetched during execution of the second full version of the target web page,
    determining a fourth signature associated with the second partial version of the target web page, wherein the fourth signature identifies a fourth set of the plurality of objects that are fetched during execution of the second partial version of the target web page,
    comparing the third signature to the fourth signature to determine whether the third signature matches the fourth signature, and
    in response to determining that the third signature matches the fourth signature, determining that the second target function can be removed from the target web page without affecting at least one of the plurality of objects when the target web page is executed.

10. The non-transitory computer-readable storage medium of claim 9, wherein the operations further comprise determining if the second target function is last in the sorted list of functions.

11. The non-transitory computer-readable storage medium of claim 10, wherein the operations further comprise, in response to determining that the second target function is not last in the sorted list of functions:
  starting a third iteration of whittling; and
  during the third iteration of whittling,
    generating a third full version of the target web page, wherein the third full version of the target web page comprises the plurality of functions except the first target function and the second target function,
    selecting from the sorted list, a third target function from the plurality of functions to be tested to determine whether the third target function also can be removed from the target web page without affecting at least one of the plurality of objects when the target web page is executed, wherein the third target function is third in the sorted list of functions,
    generating a third partial version of the target web page, wherein the third partial version of the target web page comprises the third full version of the target web page with the third target function removed,
    determining a fifth signature associated with the third full version of the target web page, wherein the fifth signature identifies a fifth set of the plurality of objects that are fetched during execution of the third full version of the target web page, determining a sixth signature associated with the third partial version of the target web page, wherein the sixth signature identifies a sixth set of the plurality of objects that are fetched during execution of the third partial version of the target web page, and comparing the fifth signature to the sixth signature to determine whether the fifth signature matches the sixth signature.

12. The non-transitory computer-readable storage medium of claim 11, wherein the operations further comprise, in response to determining that the fifth signature matches the sixth signature, determining that the third target function can be removed from the target web page without affecting at least one of the plurality of objects when the target web page is executed.

13. The non-transitory computer-readable storage medium of claim 11, wherein the operations further comprise, in response to determining that the fifth signature does not match the sixth signature, determining that the third target function cannot be removed from the target web page without affecting at least one of the plurality of objects when the target web page is executed.

14. The non-transitory computer-readable storage medium of claim 9, wherein the operations further comprise, in response to determining that the second target function is last in the sorted list of functions, generating a final version for the target web page, wherein the final version of the target web page comprises the plurality of functions except the first target function and the second target function.

15. A whittling proxy system comprising:
a processor; and
memory comprising computer-executable instructions that, when executed by the processor, cause the processor to perform operations comprising
receiving a target web page comprising a plurality of functions and a plurality of objects,
sorting the plurality of functions in decreasing order of computational effort based upon an execution time of each function of the plurality of functions,
creating a sorted list of functions comprising the plurality of functions sorted in the decreasing order of computational effort,
starting a first iteration of whittling, and
during the first iteration of whittling,
generating a first full version of the target web page, wherein the first full version of the target web page comprises the plurality of functions,
selecting, from the sorted list, a first target function from the plurality of functions to be tested to determine whether the first target function can be removed from the first full version of the target web page without affecting at least one of the plurality of objects when the target web page is executed, wherein the first target function is first in the sorted list of functions,
generating a first partial version of the target web page, wherein the first partial version of the target web page comprises the first full version of the target web page with the first target function removed;
determining a first signature associated with the first full version of the target web page, wherein the first signature identifies a first set of the plurality of objects that are fetched during execution of the first full version of the target web page,
determining a second signature associated with the first partial version of the target web page, wherein the second signature identifies a second set of the plurality of objects that are fetched during execution of the first partial version of the target web page,
comparing the first signature and the second signature to determine whether the first signature matches the second signature,
in response to determining that the first signature matches the second signature, determining that the first target function can be removed from the target web page without affecting at least one of the plurality of objects when the target web page is executed,
starting a second iteration of whittling,
during the second iteration of whittling,
generating a second full version of the target web page, wherein the second full version of the target web page comprises the plurality of functions except the first target function,
selecting, from the sorted list, a second target function from the plurality of functions to be tested to determine whether the second target function also can be removed from the target web page without affecting at least one of the plurality of objects when the target web page is executed, wherein the second target function is second in the sorted list of functions,
generating a second partial version of the target web page, wherein the second partial version of the target web page comprises the second full version of the target web page with the second target function removed;
determining a third signature associated with the second full version of the target web page, wherein the third signature identifies a third set of the plurality of objects that are fetched during execution of the second full version of the target web page,
determining a fourth signature associated with the second partial version of the target web page, wherein the fourth signature identifies a fourth set of the plurality of objects that are fetched during execution of the second partial version of the target web page,
comparing the third signature to the fourth signature to determine whether the third signature matches the fourth signature, and
in response to determining that the third signature matches the fourth signature, determining that the second target function can be removed from the target web page without affecting at least one of the plurality of objects when the target web page is executed.

16. The whittling proxy system of claim 15, wherein the operations further comprise determining if the second target function is last in the sorted list of functions.

17. The whittling proxy system of claim 16, wherein the operations further comprise, in response to determining that the second target function is not last in the sorted list of functions:
starting a third iteration of whittling; and
during the third iteration of whittling,
generating a third full version of the target web page, wherein the third full version of the target web page comprises the plurality of functions except the first target function and the second target function, selecting, from the sorted list, a third target function from the plurality of functions to be tested to determine whether the third target function also can be removed from the target web page without affecting at least one of the plurality of objects when the target web page is executed, wherein the third target function is third in the sorted list of functions, generating a third partial version of the target web page, wherein the third partial version of the target web page comprises the third full version of the target web page with the third target function removed, determining a fifth signature associated with the third full version of the target web page, wherein the fifth signature identifies a fifth set of the plurality of objects that are fetched during execution of the third full version of the target web page, determining a sixth signature associated with the third partial version of the target web page, wherein the sixth signature identifies a sixth set of the plurality of objects that are fetched during execution of the third partial version of the target web page, and comparing the fifth signature to the sixth signature to determine whether the fifth signature matches the sixth signature.

18. The whittling proxy system of claim 17, wherein the operations further comprise, in response to determining that the fifth signature matches the sixth signature, determining that the third target function can be removed from the target web page without affecting at least one of the plurality of objects when the target web page is executed.

19. The whittling proxy system of claim 17, wherein the operations further comprise, in response to determining that the fifth signature does not match the sixth signature, determining that the third target function cannot be removed from the target web page without affecting at least one of the plurality of objects when the target web page is executed.

20. The whittling proxy system of claim 16, wherein the operations further comprise, in response to determining that the second target function is last in the sorted list of functions, generating a final version for the target web page, wherein the final version of the target web page comprises the plurality of functions except the first target function and the second target function.

\* \* \* \* \*